(12) United States Patent
Ouyang

(10) Patent No.: US 6,674,372 B1
(45) Date of Patent: Jan. 6, 2004

(54) CHINESE CHARACTER INPUT METHOD USING NUMERIC KEYS AND APPARATUS THEREOF

(75) Inventor: Yen I Ouyang, Taipei Hsien (TW)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/549,516

(22) Filed: Apr. 14, 2000

(30) Foreign Application Priority Data

Apr. 16, 1999 (JP) .......................................... 11-109310

(51) Int. Cl.$^7$ ............................................. H03M 11/00
(52) U.S. Cl. .......................... 341/28; 279/368; 345/171
(58) Field of Search ................... 341/23, 28; 400/109, 400/110, 484; 345/171; 379/368

(56) References Cited

U.S. PATENT DOCUMENTS

| | | | | |
|---|---|---|---|---|
| 4,954,955 A | * | 9/1990 | Chiu | 341/22 |
| 5,212,638 A | * | 5/1993 | Bernath | 341/28 |
| 5,331,557 A | | 7/1994 | Liu | |
| 5,360,343 A | | 11/1994 | Tang | |
| 6,005,498 A | * | 12/1999 | Yang et al. | 341/23 |
| 6,007,339 A | | 12/1999 | Zen et al. | |
| 6,281,884 B1 | * | 8/2001 | Chang et al. | 341/28 |
| 6,307,541 B1 | * | 10/2001 | Ho et al. | 341/28 |

FOREIGN PATENT DOCUMENTS

| | | |
|---|---|---|
| GB | 2121220 | 12/1983 |
| WO | 95/07505 | 3/1995 |

OTHER PUBLICATIONS

Patent Abstracts of Japan, vol. 11, No. 260 (P–608), published Aug. 22, 1987, for Japanese Patent Publication No. SHO 62–63364 (Yoko Gawa).

* cited by examiner

*Primary Examiner*—Michael Horabik
*Assistant Examiner*—Hung Dang
(74) *Attorney, Agent, or Firm*—Greenblum & Bernstein, P.L.C.

(57) ABSTRACT

A method for inputting Chinese character using numeric keys, comprises allocating all phonetic symbols of the Chinese language on the numeric keys, setting a dictionary for storing phonetic symbols together with single Chinese characters or words corresponding thereto, inputting a key signal from numeric keys by user's operation, retrieving a phonetic symbol or a tone symbol corresponding to the input key signal, obtaining a phonetic symbol or tone symbol from the retrieved symbol in accordance with a combination rule of the number of operations and phonetic symbols of the Chinese language, verifying whether the obtained symbol is a phonetic symbol or a tone symbol, converting phonetic symbol string which has been input to a corresponding single Chinese character or word with reference to the dictionary and then outputting to a display when the retrieved symbol is a tone symbol.

3 Claims, 20 Drawing Sheets

Fig.2

| 1<br>ㄅㄆㄚㄛ | 2<br>ㄇㄈㄜㄝ | 3<br>ㄉㄊㄞㄟ |
|---|---|---|
| 4<br>ㄋㄌㄠㄡ | 5<br>ㄍㄎㄢㄣ | 6<br>ㄏㄐㄤ |
| 7<br>ㄑㄒㄥㄦ | 8<br>ㄓㄔ FIRST TONE | 9<br>ㄕㄖ SECOND TONE |
| *<br>ㄧㄨㄩ | 0<br>ㄗㄘ THIRD TONE | #<br>ㄙ FOURTH TONE<br>LIGHT TONE |

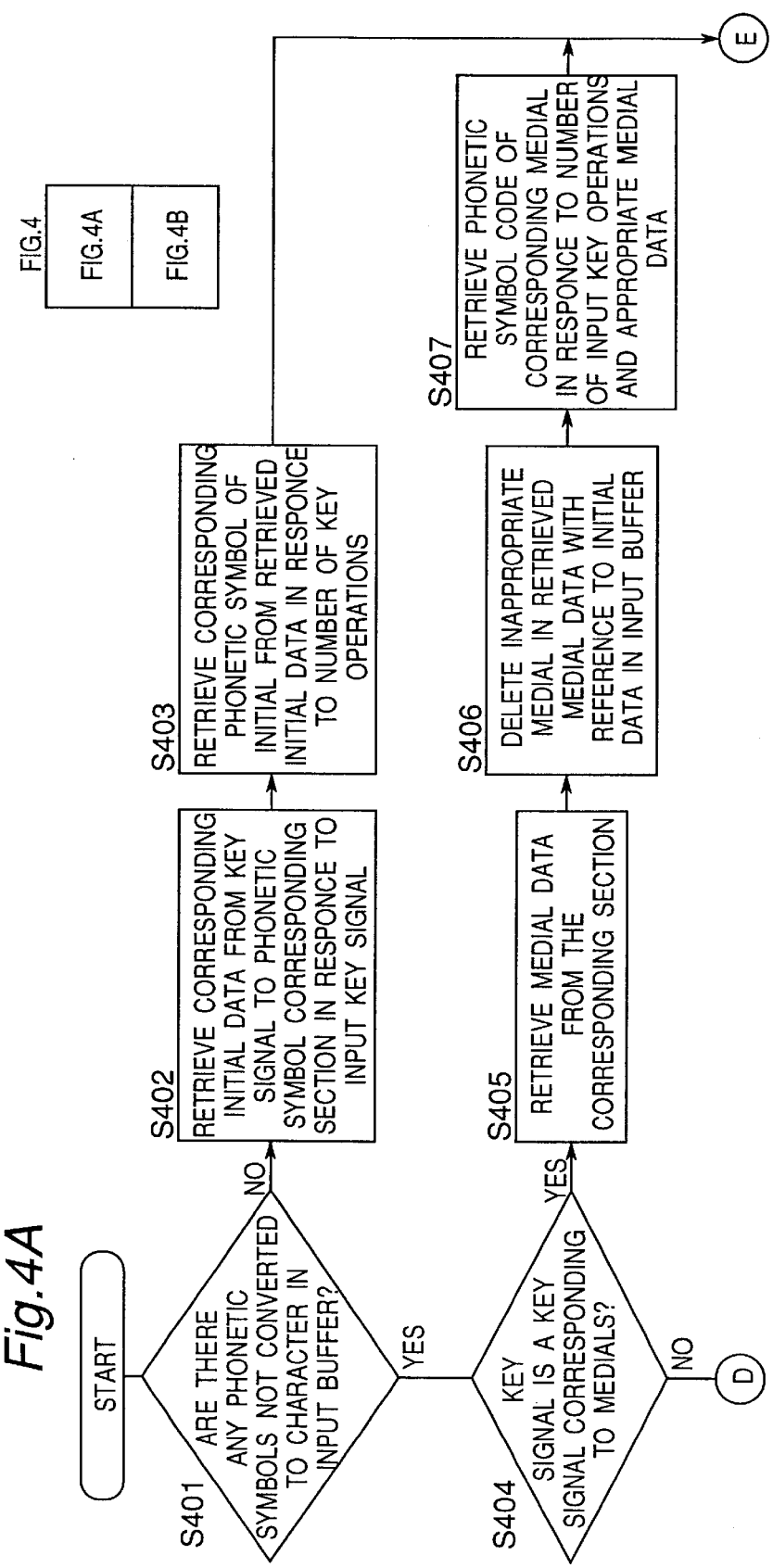

Fig.6

| INPUT KEY | CONVERSION RESULT |
|---|---|
| 8 | ㄓ |
| 8 * | ㄓㄨ |
| 8 * 7 | ㄓㄨㄥ |
| 8 * 7 8 | 中 |
| 8 * 7 8 6 | 中ㄏ |
| 8 * 7 8 6 * | 中ㄏㄨ |
| 8 * 7 8 6 * 1 | 中ㄏㄨㄚ |
| 8 * 7 8 6 * 1 9 | 中華 |
| 8 * 7 8 6 * 1 9 2 | 中華ㄇ |
| 8 * 7 8 6 * 1 9 2 * | 中華ㄇㄧ |
| 8 * 7 8 6 * 1 9 2 * 55 | 中華ㄇㄧㄣ |
| 8 * 7 8 6 * 1 9 2 * 55 9 | 中華岷 |
| 8 * 7 8 6 * 1 9 2 * 55 9 5 | 中華岷ㄍ |
| 8 * 7 8 6 * 1 9 2 * 55 9 5 * | 中華岷ㄍㄨ |
| 8 * 7 8 6 * 1 9 2 * 55 9 5 * 11 | 中華岷ㄍㄨㄛ |
| 8 * 7 8 6 * 1 9 2 * 55 9 5 * 11 9 | 中華民國 |

Fig.7A

*1: PHONETIC SYMBOL
*2: NUMBER OF KEY OPERATIONS

Fig.7B

*1: PHONETIC SYMBOL
*2: NUMBER OF KEY OPERATIONS

Fig.7C

| *1 | *2 | *1 | *2 | *1 | *2 | *1 | *2 | *1 | *2 | *1 | *2 | *1 | *2 |
|---|---|---|---|---|---|---|---|---|---|---|---|---|---|
| ㄅㄨㄛˊ | 5 | ㄊㄧˇ | 5 | ㄋㄚˊ | 5 | ㄋㄚˋ· | 4 | ㄋㄧ-ㄌˇ | 5 | ㄉㄤˋ | 4 | ㄉㄨㄢˊ | 6 |
| ㄅㄨㄣˇ | 5 | ㄊㄧˊ | 5 | ㄋㄚˇ | 5 | ㄋㄜˋ· | 4 | ㄋㄋˊ | 3 | ㄉㄤˋ | 4 | ㄉㄨㄢˇ | 6 |
| ㄅㄨㄣˊ | 5 | ㄊㄧㄝˋ | 5 | ㄋㄞˊ | 5 | ㄊㄜˋ· | 4 | ㄋㄨˋ | 4 | ㄉㄥ | 4 | ㄉㄨㄢˊ | 6 |
| ㄅㄨㄥˋ | 4 | ㄊㄧㄝˋ | 5 | ㄋㄞˇ | 5 | ㄋㄞˋ˙ | 5 | ˙ㄋㄨˋ | .3 | ㄉㄥˊ | 4 | ㄉㄨㄢˊ | 7 |
| ㄅㄨㄥˋ | 5 | ㄊㄧㄠˋ | 4 | ㄋㄞˋ | 5 | ㄋㄞˋ· | 5 | ˙ㄋㄨˋ | 4 | ㄉㄥˇ | 5 | ㄉㄨㄢˇ | 7 |
| ㄅㄨㄣ | 4 | ㄊㄧㄠˇ | 4 | ㄋㄠ· | 5 | ㄋㄞˋ· | 4 | ˙ㄋㄨㄜˊ | 4 | ㄉㄥˋ | 5 | ㄉㄨㄢˇ | 7 |
| ㄅㄨㄣˇ | 4 | ㄊㄧㄠ | 6 | ㄋㄠˊ | 5 | ㄋㄞˋ· | 5 | ㄋㄨㄛˋ | 4 | ㄉㄧˊ | 5 | ㄉㄨㄢˋ | 7 |
| ㄅㄨㄣˋ | 6 | ㄊㄧㄢˇ | 6 | ㄋㄠˇ | 5 | ㄋㄚˋ | 4 | ㄋㄨㄤˊ | 3 | ㄉㄧˇ | 5 | ㄉㄨㄣ | 6 |
| ㄅㄨㄩˇ | 6 | ㄊㄧㄢˋ | 6 | ㄋㄠˋ | 5 | ㄋㄚˋˊ | 3 | ㄋㄨㄣˊ | 3 | ㄉㄧˋ• | 6 | ㄉㄨㄩ· | 6 |
| ㄅㄨㄩˋ | 5 | ㄊㄧㄣˊ | 6 | ㄋㄞˊ | 5 | ㄋㄨˋ· | 4 | ㄋㄨㄣˋ | 3 | ㄉㄧㄝˊ | 5 | ㄉㄨㄩˊ | 7 |
| ㄅㄨㄥˋ | 5 | ㄊㄧㄣˋ | 4 | ㄋㄞˋ | 5 | ㄋㄨˇ | 3 | ㄋㄨㄛ· | 3 | ㄉㄧㄝˋ | 5 | ㄉㄨㄩˇ | 7 |
| ㄅㄨㄥˋ | 5 | ㄊㄚ | 4 | ㄋㄡˋ | 5 | ㄋㄨ· | 3 | ㄋㄨㄣˋ | 4 | ㄉㄧㄠˋ | 4 | ㄉㄨㄣˋ | 7 |
| ㄅㄨㄥˋ | 5 | ㄊㄚˇ | 4 | ㄋㄡˋ | 5 | ㄋㄨ | 3 | ㄉㄚㄣˊ | 4 | ㄉㄧㄡˊ | 4 | ㄍㄚ | 3 |
| ㄜㄚ | 5 | ㄊㄚˋ | 4 | ㄋㄢ | 6 | ㄋㄨ· | 3 | ㄉㄚㄣˇ | 4 | ㄉㄧㄡˇ | 5 | ㄍㄚˊ | 3 |
| ㄜㄚˋ | 5 | ㄊㄚˇ | 4 | ㄋㄢˊ | 6 | ㄋㄜˋ | 4 | ㄉㄚㄣˋ | 5 | ㄉㄧㄡˋ | 5 | ㄍㄚˇ | 3 |
| ㄜˊ | 4 | ㄊㄚˋ | 4 | ㄋㄢˊ | 5 | ㄋㄜˇ | 3 | ㄉㄚˊ | 4 | ㄉㄧㄡˇ | 5 | ㄍㄚˋ | 4 |
| ㄜˋ | 4 | ㄊㄜˋ | 4 | ㄋㄢˇ | 5 | ㄋㄜˋ· | 3 | ㄉㄚˇ | 4 | ㄉㄧㄡˋ | 5 | ㄍㄚˋ | 3 |
| ㄜㄞˋ | 4 | ㄊㄞˋ | 4 | ㄋㄡˊ | 5 | ㄋㄜㄝˋ | 3 | ㄉㄚˋ | 4 | ㄉㄧㄠˋ | 4 | ㄍㄜˋ | 3 |
| ㄜㄞˊ· | 5 | ㄊㄞˋ | 4 | ㄋㄡˇ | 6 | ㄋㄜㄝˋ | 3 | ㄉㄚˋ· | 4 | ㄉㄨㄞˋ | 4 | ㄍㄜˋ· | 3 |

*1: PHONETIC SYMBOL
*2: NUMBER OF KEY OPERATIONS

Fig.7D

| *1 | *2 | *1 | *2 | *1 | *2 | *1 | *2 | *1 | *2 | *1 | *2 |
|---|---|---|---|---|---|---|---|---|---|---|---|
| ㄊㄠ | 4 | ㄊㄨㄛˇ | 4 | ㄋㄚˊ | 6 | ㄉㄜ· | 3 | ㄉㄞˊ | 5 | ㄍㄜˋ | 3 |
| ㄊㄠˊ | 4 | ㄊㄨㄛˋ | 4 | ㄋㄚˇ | 6 | ㄉㄞˊ | 3 | ㄉㄞˇ | 4 | ㄍㄜˊ | 3 |
| ㄊㄠˇ | 4 | ㄊㄨㄟˊ | 4 | ㄋㄚˋ | 6 | ㄉㄞˇ | 3 | ㄉㄞˋ | 4 | ㄍㄞ | 3 |
| ㄊㄠˋ | 4 | ㄊㄨㄟˇ | 4 | ㄋㄚˊ | 6 | ㄉㄞˋ | 4 | ㄉㄞˋ | 4 | ㄍㄞˇ | 6 |
| ㄊㄡ· | 4 | ㄊㄨㄟˋ | 5 | ㄋㄚㄝ | 6 | ㄉㄞˋ | 4 | ㄉㄞˊ | 5 | ㄍㄞˋ | 6 |
| ㄊㄡ | 4 | ㄊㄨㄣˊ | 5 | ㄋㄞˇ | 6 | ㄉㄞˋ | 4 | ㄉㄞˇ | 5 | ㄍㄟˋ | 6 |
| ㄊㄡˊ | 5 | ㄊㄨㄣˇ | 5 | ㄋㄞˋ | 6 | ㄉㄞˇ | 4 | ㄉㄞˊ | 5 | ㄍㄠ | 5 |
| ㄊㄡˇ | 5 | ㄊㄨㄣˋ | 5 | ㄋㄞˊ | 6 | ㄉㄠˋ | 5 | ㄉㄞˇ | 5 | ㄍㄠˇ | 5 |
| ㄊㄡˋ | 5 | ㄊㄨㄥ | 6 | ㄋㄡˊ | 7 | ㄉㄡ | 4 | ㄉㄞˋ | 5 | ㄍㄠˋ | 5 |
| ㄊㄢ | 4 | ㄊㄨㄥˊ | 4 | ㄋㄡˇ | 7 | ㄉㄡˇ | 4 | ㄉㄢ | 5 | ㄍㄡ | 5 |
| ㄊㄢˊ | 4 | ㄊㄨㄥˇ | 4 | ㄋㄡˋ | 6 | ㄉㄡˋ | 4 | ㄉㄢˇ | 6 | ㄍㄡˇ | 4 |
| ㄊㄢˇ | 4 | ㄊㄨㄥˋ | 4 | ㄋㄢˊ | 6 | ㄉㄢ | 4 | ㄉㄢˋ | 4 | ㄍㄡˋ | 4 |
| ㄊㄢˋ | 4 | ㄊㄨㄥˋ | 4 | ㄋㄢˇ | 3 | ㄉㄢˇ | 4 | ㄉㄤˇ | 4 | ㄍㄢ | 6 |
| ㄊㄤ | 4 | ㄋㄚˊ | 3 | ㄋㄤˊ | 3 | ㄉㄢˋ | 4 | ㄉㄤˋ | 4 | ㄍㄢˇ | 6 |
| ㄊㄥ | 4 | ㄋㄚˇ | 3 | ㄋㄤˇ | 3 | ㄉㄤ | 5 | ㄉㄨㄛˊ | 4 | ㄍㄢˋ | 6 |
| ㄊㄧ | 3 | ㄋㄚˋ | 3 | ㄋㄤˋ | 3 | ㄉㄨˋ·   | 4 | ㄉㄨㄛˇ | 4 | ㄍㄤ | 7 |

*1: PHONETIC SYMBOL
*2: NUMBER OF KEY OPERATIONS

Fig.7E

| *1 | *2 | *1 | *2 | *1 | *2 | *1 | *2 | *1 | *2 | *1 | *2 |
|---|---|---|---|---|---|---|---|---|---|---|---|
| ㄍㄤˋ | 3 | ㄏㄠ | 3 | ㄏㄜ | 4 | ㄏㄨㄟˋ | 3 | ㄐㄧㄣˇ | 5 | ㄐㄧㄤˊ | 6 |
| ㄍㄥ | 3 | ㄏㄠˊ | 3 | ㄏㄜˊ | 4 | ㄏㄨㄟˇ | 3 | ㄐㄧㄣˋ | 5 | ㄐㄧㄤˇ | 6 |
| ㄍㄥˇ | 3 | ㄏㄠˇ | 3 | ㄏㄜˋ | 5 | ㄏㄨㄟˋ | 3 | ㄐㄧㄥ | 4 | ㄐㄧㄤˋ | 5 |
| ㄍㄥˋ | 3 | ㄏㄠˋ | 3 | ㄏㄞ | 5 | ㄏㄨㄣ | 3 | ㄐㄧㄥˊ | 4 | ㄐㄧㄤˋ | 5 |
| ㄍㄨ | 3 | ㄏㄠˋ | 3 | ㄏㄞˊ | 5 | ㄏㄨㄣˊ | 3 | ㄐㄧㄥˇ | 4 | ㄐㄧㄥˋ | 5 |
| ㄍㄨˇ | 3 | ㄏㄢ | 3 | ㄏㄞˇ | 4 | ㄏㄨㄣˇ | 3 | ㄐㄧㄥˋ | 4 | ㄐㄧㄥˋ | 5 |
| ㄍㄨˋ | 3 | ㄏㄢˊ | 3 | ㄏㄞˋ | 4 | ㄏㄨㄣˋ | 4 | ㄐㄩ | 4 | ㄐㄧㄤˋ | 4 |
| ㄍㄨ・ | 3 | ㄏㄢˇ | 3 | ㄏㄟ | 4 | ㄏㄨㄤ | 4 | ㄐㄩˊ | 5 | ㄐㄧㄤˋ | 4 |
| ㄍㄨㄚ | 4 | ㄏㄢˋ | 3 | ㄏㄠ | 5 | ㄏㄨㄤˊ | 4 | ㄐㄩˇ | 5 | ㄐㄩˇ | 4 |
| ㄍㄨㄚˇ | 4 | ㄏㄤ | 3 | ㄏㄠˊ | 5 | ㄏㄨㄤˇ | 4 | ㄐㄩˋ | 4 | ㄐㄩˇ | 4 |
| ㄍㄨㄚˋ | 5 | ㄏㄤˊ | 3 | ㄏㄠˇ | 4 | ㄏㄨㄤˋ | 4 | ㄐㄩㄝ | 4 | ㄐㄩㄝˊ | 4 |
| ㄍㄨㄛ | 5 | ㄏㄤˋ | 4 | ㄏㄡ | 4 | ㄏㄨㄥ | 4 | ㄐㄩㄝˊ | 4 | ㄐㄩㄥˊ | 4 |
| ㄍㄨㄛˊ | 5 | ㄏㄥ | 4 | ㄏㄡˊ | 4 | ㄏㄨㄥˊ | 3 | ㄐㄩㄝˇ | 4 | ㄐㄩㄥˋ | 4 |
| ㄍㄨㄛˇ | 5 | ㄏㄥˊ | 4 | ㄏㄡˇ | 4 | ㄏㄨㄥˇ | 3 | ㄐㄩㄝˋ | 5 | ㄐㄩㄥˋ | 4 |
| ㄍㄨㄛˋ | 6 | ㄏㄥˋ | 4 | ㄏㄡˋ | 4 | ㄏㄨㄥˋ | 3 | ㄐㄩㄣ | 4 | ㄐㄩˋ | 5 |
| ㄍㄨㄞ | 4 | ㄏㄨ | 4 | ㄏㄢ | 4 | ㄐㄧ | 3 | ㄐㄩㄣˇ | 4 | ㄐㄩㄝˋ | 5 |
| ㄍㄨㄞˇ | 4 | ㄏㄨˊ | 4 | ㄏㄢˇ | 4 | ㄐㄧˊ | 3 | ㄐㄩㄣˋ | 4 | ㄐㄩㄝˋ | 5 |
| ㄍㄨㄟˊ | 5 | ㄏㄨˇ | 4 | ㄏㄢˋ | 4 | ㄐㄧˇ | 3 | ㄐㄩㄥ | 4 | ㄐㄩㄢ | 6 |
| ㄍㄨㄟˇ | 5 | ㄏㄨˋ | 4 | ㄏㄣˊ | 4 | ㄐㄧˋ | 4 | ㄐㄩㄥˋ | 5 |   |   |
| ㄍㄨㄟˋ | 5 | ㄏㄨㄚ | 4 | ㄏㄣˇ | 5 | ㄐㄧㄚ | 4 |   |   |   |   |

*1 : PHONETIC SYMBOL  
*2 : NUMBER OF KEY OPERATIONS

Fig. 7F

| *1 | *2 | *1 | *2 | *1 | *2 | *1 | *2 | *1 | *2 | *1 | *2 |
|---|---|---|---|---|---|---|---|---|---|---|---|
| ㄍㄨㄢ | 4 | ㄎㄚㄨ丶 | 4 | ㄏㄤ丶 | 6 | ㄐㄧ丶 | 4 | ㄑ一 | 5 | ㄑㄩㄢ丶 | 5 |
| ㄍㄨㄢˇ | 4 | ㄎㄚㄞˇ | 4 | ㄏㄤˊ | 5 | ㄐㄧㄚˊ | 3 | ㄑㄧˊ | 5 | ㄑㄩㄢˇ | 3 |
| ㄍㄨㄢˋ | 4 | ㄎㄚㄞˋ | 4 | ㄏㄤˇ | 5 | ㄐㄧㄚˇ | 3 | ㄑㄧˇ | 5 | ㄑㄩㄢˊ | 3 |
| ㄍㄨㄣˇ | 5 | ㄎㄚㄣˇ | 5 | ㄏㄥ | 6 | ㄐㄧㄚˋ | 3 | ㄑㄧˋ | 5 | ㄑㄩㄣˊ | 3 |
| ㄍㄨㄤ | 4 | ㄎㄚㄤ | 4 | ㄏㄥˊ | 6 | ㄐㄧㄝ | 3 | ㄑㄧㄚˇ | 6 | ㄑㄩㄣˋ | 3 |
| ㄍㄨㄤˇ | 4 | ㄎㄚㄤˇ | 4 | ㄏㄨ | 5 | ㄐㄧㄝˊ | 3 | ㄑㄧㄝ | 5 | ㄑㄩㄥ | 4 |
| ㄍㄨㄤˋ | 4 | ㄎㄚㄤˋ | 4 | ㄏㄨˊ | 5 | ㄐㄧㄝˇ | 3 | ㄑㄧㄝˊ | 5 | ㄒㄧ | 4 |
| ㄍㄨㄥ | 4 | ㄎㄥ | 4 | ㄏㄨˇ | 6 | ㄐㄧㄝˋ | 3 | ㄑㄧㄝˇ | 5 | ㄒㄧˊ | 4 |
| ㄍㄨㄥˇ | 4 | ㄎㄥˇ | 4 | ㄏㄨˋ | 6 | ㄐㄧㄠ | 4 | ㄑㄧㄝˋ | 5 | ㄒㄧˇ | 4 |
| ㄍㄨㄥˋ | 5 | ㄎㄥˋ | 5 | ㄏㄨㄚˊ | 6 | ㄐㄧㄠˇ | 4 | ㄑㄧㄠ | 5 | ㄒㄧˋ | 4 |
| ㄎㄚ | 4 | ㄎㄨ | 4 | ㄏㄨㄚˋ | 5 | ㄐㄧㄠˋ | 4 | ㄑㄧㄠˇ | 5 | ㄒㄧㄚ | 4 |
| ㄎㄚˇ | 4 | ㄎㄨˇ | 4 | ㄏㄨㄛˊ | 5 | ㄐㄧㄡ | 5 | ㄑㄧㄠˋ | 5 | ㄒㄧㄚˊ | 4 |
| ㄎㄚˋ | 4 | ㄎㄨˋ | 4 | ㄏㄨㄛˇ | 5 | ㄐㄧㄡˇ | 5 | ㄑㄧㄡ | 5 | ㄒㄧㄚˇ | 4 |
| ㄎㄜ | 4 | ㄏㄚ | 3 | ㄏㄨㄞˊ | 5 | ㄐㄧㄡˋ | 5 | ㄑㄧㄡˊ | 5 | ㄒㄧㄝ | 5 |
| ㄎㄜˊ | 4 | ㄏㄚˊ | 3 | ㄏㄨㄞˋ | 5 | ㄐㄩ | 4 | ㄑㄧㄢ | 5 | ㄒㄧㄝˊ | 5 |
| ㄎㄜˇ | 4 | ㄏㄞ | 3 | ㄏㄨㄢ | 5 | ㄐㄩˊ | 4 | ㄑㄧㄢˊ | 5 | ㄒㄧㄝˇ | 5 |
| ㄎㄞ | 4 | ㄏㄞˊ | 4 | ㄏㄨㄢˊ | 5 | ㄐㄩˇ | 4 | ㄑㄧㄢˇ | 5 | ㄒㄧㄝˋ | 4 |

*1: PHONETIC SYMBOL
*2: NUMBER OF KEY OPERATIONS

Fig.7G

| *1 | *2 | *1 | *2 | *1 | *2 | *1 | *2 | *1 | *2 | *1 | *2 |
|---|---|---|---|---|---|---|---|---|---|---|---|
| ㄊ一ㄠˊ | 5 | ㄓㄚˋ | 5 | ㄓㄨㄞˋ | 3 | ㄓ尢ˋ | 5 | 4ㄗㄜˇ | 4 | 3ㄗㄨㄟˋ | 5 |
| ㄊ一ㄠˇ | 5 | ㄓㄚˇ | 5 | ㄓㄨㄢ | 3 | ㄓ尢ˇ | 5 | 4ㄗㄜˋ | 4 | 3ㄗㄨㄢ | 4 |
| ㄊ一ㄠˋ | 5 | ㄓㄚˊ | 5 | ㄓㄨㄢˇ | 3 | ㄓ尢ˋ | 5 | 4ㄗㄞ | 4 | 3ㄗㄨㄣˊ | 4 |
| ㄊ一ㄡ | 6 | ㄓㄜ | 6 | ㄓㄨㄣ | 3 | ㄓㄥˊ | 6 | 4ㄗㄞˇ | 4 | 3ㄗㄨㄣˋ | 4 |
| ㄊ一ㄡˊ | 6 | ㄓㄜˊ | 6 | ㄓㄨㄣˇ | 3 | 6一ㄥˇ | 4 | 4ㄗㄞˋ | 4 | 4ㄗㄨㄥ | 4 |
| ㄊ一ㄡˇ | 6 | ㄓㄜˇ | 6 | ㄓㄨㄥ | 3 | 6一ㄥˋ | 5 | 4ㄗㄟˊ | 4 | 4ㄗㄨㄥˇ | 4 |
| ㄊ一ㄢ | 5 | ㄓㄜˋ | 5 | ㄓㄨㄥˇ | 3 | 5ㄗ | 4 | 3ㄗㄠ | 4 | 4ㄗㄨㄥˋ | 4 |
| ㄊ一ㄢˊ | 5 | ㄓㄞ | 5 | ㄓㄨㄥˋ | 3 | 5ㄗˋ | 4 | 3ㄗㄠˊ | 3 | 3ㄗˊ | 5 |
| ㄊ一ㄢˇ | 5 | ㄓㄞˊ | 5 | 3ㄓ | 5 | 6ㄗㄚˊ | 4 | 3ㄗㄠˇ | 3 | 3ㄗˇ | 5 |
| ㄊ一ㄢˋ | 6 | ㄓㄞˇ | 5 | 3一ˊ | 4 | 6ㄗㄚˇ | 4 | 3ㄗㄠˋ | 4 | 3ㄗˋ | 5 |
| ㄊ一ㄣ | 6 | ㄓㄞˋ | 6 | 4一ˇ | 4 | 6ㄗㄚˋ | 4 | 4ㄗㄡ | 4 | 4ㄗㄞˊ | 5 |
| ㄊ一ㄣˊ | 6 | ㄓㄠ | 6 | 4一ˋ | 4 | 6ㄗㄜˊ | 4 | 4ㄗㄡˇ | 4 | 4ㄗㄞˇ | 5 |
| ㄊ一ㄣˇ | 6 | ㄓㄠˊ | 6 | 4一ㄚ | 4 | 6ㄗㄜ• | 5 | 4ㄗㄡˋ | 3 | 4ㄗㄞˋ | 5 |
| ㄊ一大 | 5 | ㄓㄠˇ | 5 | 4一ㄚˊ | 5 | 6ㄗㄡ | 5 | 3ㄗㄢ | 3 | 4ㄗㄨˊ | 5 |
| ㄊ一大ˊ | 5 | ㄓㄠˋ | 5 | 4一ㄚˇ | 5 | 6ㄗㄡˇ | 5 | 3ㄗㄢˊ | 3 | 4ㄗㄨˇ | 5 |
| ㄊ一大ˇ | 5 | ㄓㄡ | 5 | 4一ㄚˋ | 5 | 6ㄗㄡˋ | 6 | 3ㄗㄢˇ | 3 | 4ㄗㄨˋ | 5 |
| ㄊ一大ˋ | 5 | ㄓㄡˊ | 5 | 3一ㄝ | 3 | 6ㄗㄢ | 6 | 3ㄗㄢˋ | 4 | 4ㄗㄨㄛ | 5 |
| ㄊ一ㄥ | 5 | ㄓㄡˇ | 5 | 3一ㄝˊ | 3 | 5ㄗㄢˊ | 5 | 4ㄗㄣ | 4 | 4ㄗㄨㄛˊ | 5 |
| ㄊ一ㄥˊ | 5 | ㄓㄡˋ | 5 | 4一ㄝˇ | 4 | 5ㄗㄢˇ | 5 | 4ㄗㄣˊ | 4 | 4ㄗㄨㄛˇ | 5 |
| ㄊ一ㄥˇ | 5 | ㄓㄢ | 5 | 4一ㄝˋ | 4 | 5ㄗㄢˋ | 6 | 4ㄗㄣˇ | 4 | 4ㄗㄨㄛˋ | 5 |
| ㄊ一ㄥˋ | 4 | ㄓㄢˇ | 4 | 3ㄓㄜ | 3 | 5ㄗㄣˋ | 5 | 5ㄗㄣˋ | • | 5ㄗㄥ | 4 |
| ㄊㄨ | | ㄓㄢˋ | | 3一ㄝˇ | | 5ㄗㄣ大 | | 5ㄗㄣˋ 大 | | 3ㄗㄥ 大 | |

*1 : PHONETIC SYMBOL
*2 : NUMBER OF KEY OPERATIONS

Fig.7H

| *1 | *2 | *1 | *2 | *1 | *2 | *1 | *2 | *1 | *2 | *1 | *2 |
|---|---|---|---|---|---|---|---|---|---|---|---|
| ㄓㄨㄝˊ | 4 | ㄓㄨㄣ | 4 | ㄔˋ | 4 | ㄔㄞˋ | 4 | ㄔㄤˊ | 6 | ㄖㄤˊ | 3 | 4 |
| ㄓㄨㄝˇ | 4 | ㄓㄨㄣˇ | 4 | ㄔㄚ | 4 | ㄔㄞˊ | 4 | ㄔㄤˋ | 6 | ㄖㄤˇ | 3 | 4 |
| ㄓㄨㄝˋ | 4 | ㄓㄨㄤˋ | 4 | ㄔㄚˊ | 4 | ㄔㄞˇ | 4 | ㄔㄤ˙ | 6 | ㄖㄤˋ | 4 | 4 |
| ㄓㄨㄞ | 5 | ㄓㄨㄥ | 5 | ㄔㄚˇ | 3 | ㄔㄠ | 3 | ㄔㄥ | 5 | ㄖㄥˊ | 3 | 4 |
| ㄓㄨㄞˊ | 5 | ㄓㄨㄥˇ | 5 | ㄔㄚˋ | 3 | ㄔㄠˊ | 3 | ㄔㄥˊ | 5 | ㄖㄥˇ | 3 | 4 |
| ㄓㄨㄞˇ | 5 | ㄓㄨㄥˋ | 5 | ㄔㄚ˙ | 3 | ㄔㄠˇ | 3 | ㄔㄥˇ | 5 | ㄖㄥˋ | 3 | 4 |
| ㄓㄨㄢ | 5 | ㄓㄜ | 4 | ㄔㄜ | 3 | ㄔㄠˋ | 3 | ㄔㄥˋ | 5 | ㄖˊ | 3 | 4 |
| ㄓㄨㄢˇ | 5 | ㄓㄜˊ | 4 | ㄔㄜˊ | 3 | ㄔㄡˊ | 3 | ㄔㄨ | 5 | ㄖˇ | 3 | 4 |
| ㄓㄨㄢˋ | 5 | ㄓㄜˇ | 4 | ㄔㄜˋ | 3 | ㄔㄡˇ | 3 | ㄔㄨˊ | 5 | ㄖˋ | 3 | 4 |
| ㄓㄨㄣ | 5 | ㄓㄜˋ | 4 | ㄔ | 3 | ㄔㄡˋ | 4 | ㄔㄨˇ | 5 | ㄖㄨ | 3 | 4 |
| ㄓㄨㄣˊ | 6 | ㄓㄨㄥ | 4 | ㄔˊ | 2 | ㄔㄢ | 4 | ㄔㄨˋ | 2 | ㄖㄨˊ | 4 | 4 |
| ㄓㄨㄣˇ | 6 | ㄓㄨㄥˇ | 4 | ㄔˇ | 5 | ㄔㄢˊ | 4 | ㄔㄨㄚ | 3 | ㄖㄨˇ | 4 | 5 |
| ㄓㄨㄣˋ | 6 | ㄓㄨㄥˋ | 4 | ㄔˋ | 5 | ㄔㄢˇ | 4 | ㄔㄨㄚˋ | 3 | ㄖㄨˋ | 4 | 4 |
| ㄓㄨㄥ | 5 | ㄔ | 5 | ㄔˋ | 4 | ㄔㄢˋ | 5 | ㄔㄨㄞ | 3 | ㄖㄨㄛˋ | 4 | 2 |
| ㄓㄨㄥˇ | 5 | ㄔˊ | 5 | ㄔ˙ | 4 | ㄔㄣ | 5 | ㄔㄨㄞˊ | 4 | ㄖㄨㄢˇ | 4 | 2 |
| ㄓ | 2 | ㄔˇ | 4 | ㄔㄞ | 4 | ㄔㄣˊ | 4 | ㄔㄨㄞˇ | 4 | ㄗ | 4 | 2 |
| ㄓˊ | 2 |  |  |  |  | ㄔㄣˇ | 4 | ㄔㄨㄞˋ | 4 | ㄗˊ | 4 | 2 |
| ㄓˇ | 2 |  |  |  |  | ㄔㄣˋ | 5 | ㄔㄨㄟˊ | 5 | ㄗˇ | 5 | 2 |
| ㄓˋ | 3 |  |  |  |  | ㄔㄤ | 5 | ㄔㄨㄟˋ | 5 | ㄗˋ | 5 | 2 |

*1: PHONETIC SYMBOL
*2: NUMBER OF KEY OPERATIONS

Fig.71

| *1 | *2 | *1 | *2 | *1 | *2 | *1 | *2 | *1 | *2 | *1 | *2 |
|---|---|---|---|---|---|---|---|---|---|---|---|
| ㄆ･ | 3 | ㄆㄚˋ | 3 | ㄆㄞˋ | 5 | ㄆㄤˋ | 5 | 4ㄦˊ | 4 | 3ㄨˋ | 3 |
| ㄆㄚ | 3 | ㄆㄚㄌ | 3 | ㄆㄞㄢ | 4 | ㄆㄤㄨˋ | 4 | 4ㄦˇ | 4 | 3ㄨˇ | 3 |
| ㄆㄚˊ | 3 | ㄆㄚㄌˇ | 3 | ㄆㄞㄢˊ | 4 | ㄆㄤㄨㄞˋ | 5 | 4ㄦˋ | 4 | 3ㄨˋ | 3 |
| ㄆㄜ | 3 | ㄆㄚˊ | 3 | ㄆㄞㄢˇ | 4 | 6ㄠㄨㄞˇ | 6 | 5ㄧ | 5 | 2ㄨㄚ | 2 |
| ㄆㄜˇ | 3 | ㄆㄚˊ | 3 | ㄆㄞㄢˇ | 3 | 6ㄠㄨㄚˇ | 6 | 5ㄧˊ | 5 | 2ㄨㄚˋ | 2 |
| ㄆㄜˋ | 3 | ㄆㄚˋ | 3 | ㄆㄞㄢˇㄨ | 3 | 6ㄠㄨㄢ | 6 | 5ㄧˋ | 5 | 2ㄨㄚˋ | 2 |
| ㄆㄞ | 3 | ㄆㄚˋ | 3 | ㄆㄞㄥ | 4 | 5ㄠㄨㄥ | 5 | 4ㄧˋ | 4 | 3ㄨㄚˇ | 3 |
| ㄆㄞˇ | 3 | ㄆㄚㄚ | 3 | ㄆㄞㄥˊ | 4 | 4ㄠㄥ | 4 | 4ㄧㄚ | 4 | 3ㄨㄚˊ | 3 |
| ㄆㄟˋ | 3 | ㄆㄚㄚˇ | 4 | ㄆㄞㄥˇ | 4 | 2ㄠ | 2 | 4ㄧㄚˋ | 4 | 3ㄨㄚˋ | 3 |
| ㄆㄠ | 3 | ㄆㄚㄜ | 3 | ㄆㄞㄥˋ | 4 | 2ㄠˊ | 2 | 2ㄧㄚˊ | 2 | 3ㄨㄚˋ | 3 |
| ㄆㄠˇ | 3 | ㄆㄚㄜ | 3 | ㄆㄠ | 3 | 2ㄠ | 2 | 2ㄧㄚˊ | 2 | 4ㄨㄞ | 4 |
| ㄆㄠˋ | 3 | ㄆㄚㄜˇ | 3 | ㄆㄠˋ | 3 | 2ㄠˇ | 2 | 2ㄧㄚˋ | 2 | 4ㄨㄞˋ | 4 |
| ㄆㄠˋ | 3 | ㄆㄚㄜˇ | 4 | ㄆㄠˋ | 4 | 3ㄠ | 3 | 3ㄨˋ | 3 | 4ㄨㄞˋ | 4 |
| ㄆㄡ | 3 | ㄆㄚㄛ | 3 | ㄆㄡ | 3 | 3ㄜˊ | 3 | 3ㄨˇ | 3 | 3ㄨˊ | 3 |
| ㄆㄡˇ | 3 | ㄆㄚㄛˇ | 3 | ㄆㄡˇ | 3 | 3ㄜˇ | 3 | 3ㄨˋ | 3 | 3ㄨˇ | 3 |
| ㄆㄡˋ | 3 | ㄆㄚㄡ | 3 | ㄆㄡˋ | 3 | 3ㄜˋ | 3 | 3ㄨ | 3 | 3ㄨˋ | 3 |
| ㄆㄢ | 3 | ㄆㄚㄡˇ | 3 | ㄆㄢ | 3 | 3ㄞ | 3 | 3ㄨˊ | 3 | 3ㄨˋ | 3 |
| ㄆㄢˊ | 3 | ㄆㄚㄡˇ | 4 | ㄆㄢˋ | 4 | 3ㄞˊ | 3 | 3ㄨˇ | 3 | 3ㄨˇ | 3 |
| ㄆㄢˇ | 4 | ㄆㄚㄢˊ | 4 | ㄆㄢˋ | 4 | 3ㄞˇ | 3 | 3ㄨˋ | 3 | 3ㄨˋ | 3 |
| ㄆㄢˋ | 4 | ㄆㄚㄢˊ | 4 | ㄆㄢˋ | 4 | 3ㄞˋ | 3 | 3ㄨˋ | 3 | 3ㄨˋ | 3 |

*1 : PHONETIC SYMBOL
*2 : NUMBER OF KEY OPERATIONS

Fig.7J

*1: PHONETIC SYMBOL
*2: NUMBER OF KEY OPERATIONS

Fig.7K

| *1 | *2 |
|---|---|
| ㄩㄣv | 6 |
| ㄩㄣ丶 | 6 |
| ㄩㄥ | 5 |
| ㄩㄥ╱ | 5 |
| ㄩㄥv | 5 |
| ㄩㄥ丶 | 5 |

*1 : PHONETIC SYMBOL
*2 : NUMBER OF KEY OPERATIONS

Fig.8 PRIOR ART

| *1 | 1 | 2 | 3 | 4 | 5 | 6 |
|----|---|---|---|---|---|---|
| 1 | ㄅ | ㄆ | ㄇ | ㄈ | *4 |   |
| 2 | ㄉ | ㄊ | ㄋ | ㄌ | *5 |   |
| 3 | ㄍ | ㄎ | ㄏ | *2 |   |   |
| 4 | ㄐ | ㄑ | ㄒ | *3 |   |   |
| 5 | ㄓ | ㄔ | ㄕ | ㄖ |   |   |
| 6 | ㄗ | ㄘ | ㄙ |   |   |   |
| 7 | ㄧ | ㄨ | ㄩ |   |   |   |
| 8 | ㄚ | ㄛ | ㄜ | ㄝ |   |   |
| 9 | ㄞ | ㄟ | ㄠ | ㄡ |   |   |
| 0 | ㄢ | ㄣ | ㄤ | ㄥ | ㄦ | *6 |

*1 : NUMBER OF KEYS/OPERATIONS
*2 : THIRD TONE
*3 : FOURTH TONE
*4 : FIRST TONE
*5 : SECOND TONE
*6 : LIGHT TONE

Fig.9 PRIOR ART

| 6 ㄘㄞㄗㄡㄠ | 7 ㄙㄣㄤㄛㄜ | 8 ㄚㄟ | 9 ← | 0 → |
|---|---|---|---|---|
| 1 ㄧㄅㄆㄇㄈ | 2 ˊ ㄦㄉㄊㄋㄌ | 3 ˇ ㄩㄢㄍㄎㄏ | 4 ˋ ㄐㄑㄒㄩㄝ | 5 ˙ ㄓㄔㄕㄖㄨ |

CHINESE CHARACTER INPUT METHOD USING NUMERIC KEYS AND APPARATUS THEREOF

BACKGROUND OF THE INVENTION

1. Field of the Invention

The present invention relates to a Chinese character input device for inputting a Chinese character by using the phonetic symbols of the Chinese language utilizing twelve numeric keys of a keypad of a conventional telephone set or a remote control for operating a conventional television set or audio products.

2. Description of the Related Art

The present-day life has extended the application of an electronic information processing. It has also been rapidly required to input data in Chinese language with no keyboard, but, for example, a keypad of an electronic computer, a portable telephone or a remote control operating a television set or audio products. To realize functions of a telephone directory, a memorandum pad or the function of transmitting and receiving E-Mail or simple messages in those electronic products, they have to be provided with the function of inputting a character. Providing the function of inputting the Chinese language to products can not only increase the value of the products but also enlarge an application range of the product.

Various methods of inputting the Chinese language have been applied. Most of the methods have used mainly a keyboard. It is difficult to apply these methods of inputting the Chinese language using the keyboard to electric products having less number of keys, for example, a telephone set or a remote control for operating a television set or audio products. Recently, there have been presented several patents related to a device for inputting the Chinese language to be applied to a television set or a remote control for operating a television set or audio products. For example, Taiwanese Patent Publication No. 324084 has disclosed "a device for inputting the Chinese language by a zhuyin utilizing sixteen keys". According to this invention, thirty seven phonetic symbols and five tone symbols in the Chinese language are allocated to the sixteen keys of a computer. That allocation can provide a function of determination of input key signal to implement the input function of the Chinese language in the computer. It is noted that Chinese phonetic symbols generally can be grouped into four major groups, that is, Finals serving as vowels, Medials serving as transition vowels, Initials serving as consonants, and Tones expressing intonation. The method using sixteen keys to input the Chinese language can be applied to only the computer but not to a telephone set or a remote control. In the above invention, moreover, the relation of the key with the phonetic symbol of the Chinese language is slightly rough so that it is hard to learn operation.

Taiwanese Patent Publication No. 73890 has disclosed "a method of inputting the Chinese language with European style Roman letter notation utilizing numeric keys" in which phonetic symbols corresponding to the Roman letter notation are arranged on eight numeric keys from 1 to 8 to provide the input function by the Roman letter notation. This arrangement is also rough and difficult to learn. In order to input one character, furthermore, a greater number of key operations are required.

A certain manufacturer has presented a trial product in which the phonetic symbols of the Chinese language are arranged by intuition. This arrangement is shown in FIG. 8. For example, when "[CHARCTER 1]" is to be input, a numeric key of "5" is pressed down once. When "[CHARCTER 2]" is to be input, a numeric key of "5" is pressed down twice. This arrangement is simple but the number of key operations is too large. For example, when "[CHARCTER 3]" is to be input, the total number of key operations is 15 (the key of "2" should be pressed down four times, "7" pressed twice, "0" pressed four times, "2" pressed five times). The total of legitimate combinations of the phonetic symbols of the Chinese language is 1,356. According to the arrangement of the input method, the average number of a set of key operations needs to be 9.5.

[CHARACTER 1]

ㄓ

[CHARACTER 2]

ㄔ

[CHARACTER 3]

ㄌㄨㄥˊ

There is another example. FIG. 9 illustrates a method of arranging the phonetic symbols of "a method of inputting the Chinese language by a character sound utilizing a numeric key" disclosed in Taiwanese Patent Publication No. 73889. In this method, each phonetic symbol is encoded by a key arrangement to set a code of "[CHARACTER 4]" to 12 (because it is the second symbol of the numeric key of "1", a code of "[CHARACTER 5]" to 31 (because it is the first symbol of the numeric key of "3"), and a code of "[CHARACTER 6]" to 74 (because it is the fourth symbol of the numeric key of "7"), for example. For a tone symbol, the Second, Third, Fourth and Light Tones of the Chinese language are arranged on the numeric keys of "2", "3", "4" and "5", respectively. According to this invention, characters are input by means of the above-mentioned codes and tone symbol keys. For example, when "[CHARACTER 7]" is to be input, 1411722 is pressed down, and when "[CHARACTER 8]" is to be input, 3355742 is pressed down.

[CHARACTER 4]

ㄅ

[CHARACTER 5]

ㄙ

[CHARACTER 6]

ㄛ

[CHARACTER 7]

ㄇㄧㄥˊ

[CHARACTER 8]

ㄍㄨㄛˊ

According to this method, one phonetic symbol is input by two keys and is combined with one tone symbol key, thereby inputting one character. As compared with an input method shown in FIG. 8, the number of key operations can be decreased in this method. The average number of key operations for one character approximately needs 5.7. In order to input one phonetic symbol by using two keys, it is necessary to press down two keys which are usually different from each other and the same key is not pressed down twice. It is inconvenient. Moreover, the key arrangement of the phonetic symbols is slightly rough and thus it is difficult for a user to learn the corresponding keys to the phonetic symbols. Therefore, it takes a long time to completely use these keys.

The above-mentioned inventions according to the prior art have the following problems:

(1) The method of arranging the corresponding keys of the phonetic symbols is too rough and a convenience is bad;
(2) Since the number of key operations required to input the Chinese language is too large, it takes a long time to input data in Chinese;
(3) Although twelve or more keys in the keypad of a telephone set or a remote control controlling a television set or audio products can be utilized, the twelve keys are not completely used in the prior art. Therefore, the number of the phonetic symbols corresponding to a single key is too large. Thus, it is hard to learn for users.

SUMMARY OF THE INVENTION

In order to solve the above-mentioned problems, a first aspect of the present invention is directed to a method for inputting Chinese using numeric keys in which. Chinese characters are input on a device having a numeric keypad, a storage and a display. The method comprises:

setting a key signal to phonetic symbol corresponding section to allocate all phonetic symbols of the Chinese language on the numeric keys so that three.Medials are allocated on one numeric key and Initials with Finals or Finals with Tones are selectively allocated on the other numeric keys, and to store therein each key signal and a phonetic symbol corresponding to the key signal based on the allocation;

setting, in the storage, a dictionary for storing phonetic symbols each with a single Chinese character or word, the single Chinese character or the word corresponding to the phonetic symbol;

inputting a key signal from the keypad based on user's operation in accordance with a correspondence rule of the key signal to the phonetic symbol;

retrieving a phonetic symbol or a tone symbol from the key signal to phonetic symbol corresponding section in response to the key signal input by the user;

collating the retrieved phonetic symbol or the retrieved tone symbol with phonetic symbols already input to obtain a corresponding phonetic symbol or a corresponding tone symbol in accordance with a combination rule of the number of key operations and the phonetic symbol of the Chinese language;

deciding whether the obtained symbol is a phonetic symbol or a tone symbol, and returning to the inputting a key signal to wait for user's input when the obtained symbol is decided to be a phonetic symbol, or searching the dictionary based on a phonetic symbol string already input to retrieve a corresponding single Chinese character or a corresponding word and then output the retrieved character or word to the display when the obtained symbol is decided to be a tone symbol; and returning to the inputting a key signal to wait for a next input while the user gives no command for stopping the input.

The method of allocating the numeric key and the phonetic symbol corresponding to the numeric key in the setting a key signal to phonetic symbol corresponding section may have a configuration shown in FIG. 2.

More specifically, a numeric key of "1" may correspond to symbols shown in Table A, a numeric key of "2" to symbols shown in Table B, a numeric key of "3" to symbols shown in Table C, a numeric key of "4" to symbols shown in Table D, a numeric key of "5" to symbols shown in Table E, a numeric key of "6" to symbols shown in Table F, a numeric key of "7" to symbols shown in Table G, a numeric key of "8" to symbols or a tone symbol shown in Table H, a numeric key of "9" to symbols shown in Table I, a numeric key of "0" to symbols shown in Table J, a numeric key of "*" to symbols shown in Table K, and a numeric key of "#" to symbols shown in Table L. The above-mentioned each table is as follows.

TABLE A

ㄅㄆ ㄚㄛ

TABLE B

ㄇㄈ ㄜㄝ

TABLE C

ㄉㄊ ㄞㄟ

TABLE D

ㄋㄌ ㄠㄡ

TABLE E

ㄍㄎ ㄢㄣ

TABLE F

ㄏㄐ ㄤ

TABLE G

ㄑㄒ ㄥㄦ

TABLE H

ㄓㄔ　1st Tone

TABLE I

ㄕㄖ　2nd Tone

TABLE J

ㄗㄘ　3rd Tone

TABLE K

一ㄨㄩ

TABLE L

ㄙ　4th Tone
　　Light Tone

A second aspect of the present invention is directed to an apparatus for inputting Chinese using numeric keys which has a numeric keypad, a storage and a display. The apparatus comprises a key signal to phonetic symbol corresponding section, a dictionary, a phonetic symbol and tone symbol deciding section, a Chinese character conversion section and a system controller.

The key signal to phonetic symbol corresponding section allocates all phonetic symbols of the Chinese language on the numeric keys so that three Medials are allocated on one numeric key and Initials with Finals or Finals with Tones are specified to be allocated on the other numeric keys, and for storing therein each key signal and a phonetic symbol corresponding to the key signal based on the allocation.

The dictionary stores phonetic symbols each with a single Chinese character or word. The single Chinese character or the word corresponds to the phonetic symbol.

The phonetic symbol and tone symbol deciding section collates a key signal input by a user with phonetic symbols already input based on the key signal and the number of key operations, and deciding whether the input key corresponds to a phonetic symbol or a tone symbol to decide whether the key signal is continuously received or is converted into the Chinese language.

The Chinese character conversion section searches the dictionary by using the obtained legitimate phonetic symbol string as a search key to carry out conversion into a corresponding single Chinese character or a corresponding word.

The system controller controls the key signal, and controls procedure for converting the phonetic symbol into the Chinese character and an output of data.

Related Application

It should be noted that this application is based on the Japanese Patent Application No. 11-109310, the contents of which are incorporated herein by reference.

BRIEF DESCRIPTION OF THE DRAWINGS

FIG. 2 is a diagram showing a correspondence between a key arrangement and phonetic symbols according to the embodiment of the present invention.

FIGS. 4A and 4B are a flowchart showing an operation to be executed out mainly by a phonetic symbol and tone symbol deciding section according to the embodiment of the present invention.

FIG. 6 is a diagram showing one example of a correspondence between the input key and the result of conversion according to the embodiment of the present invention.

Figure 7A:
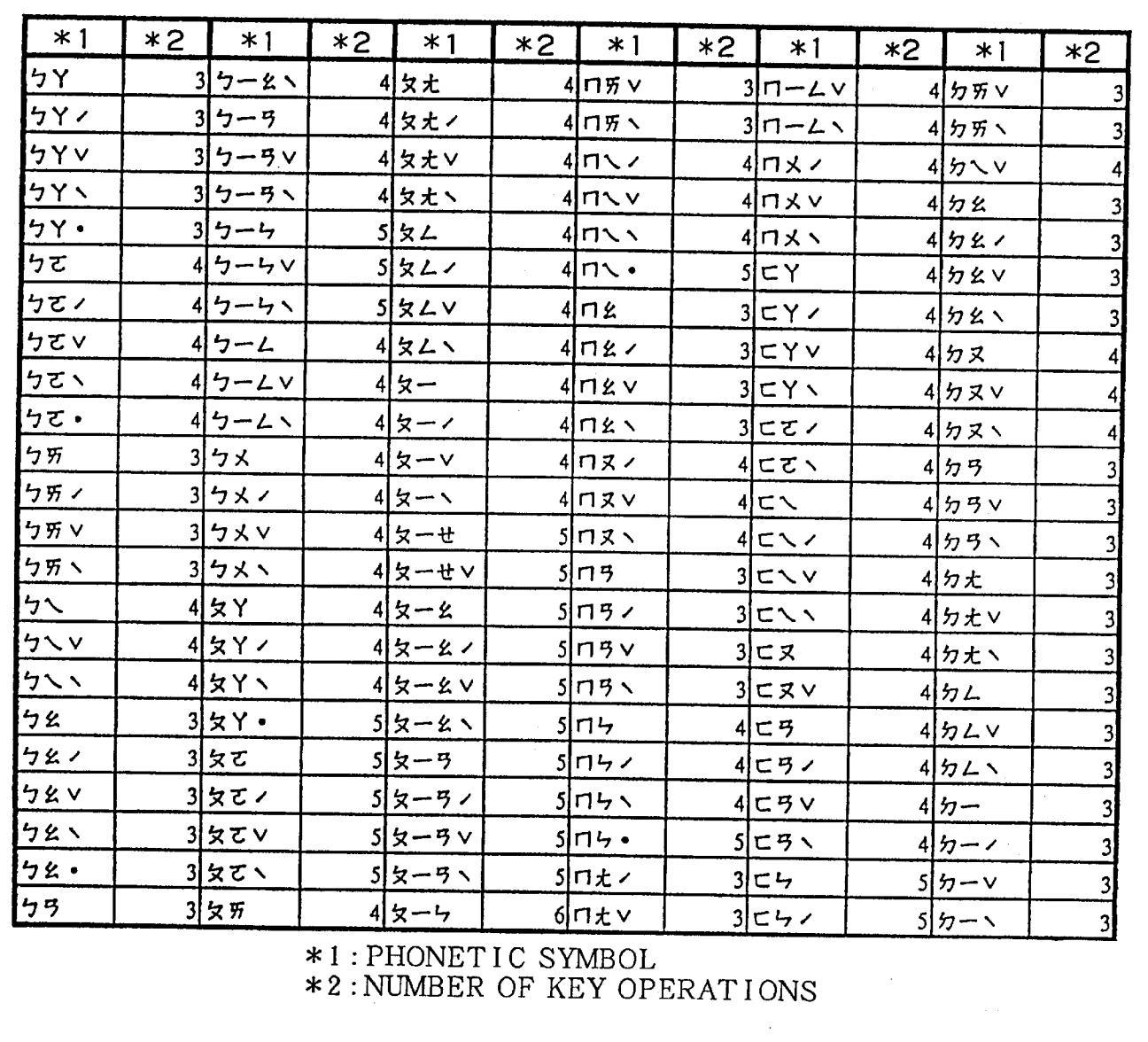
Figure 7B:
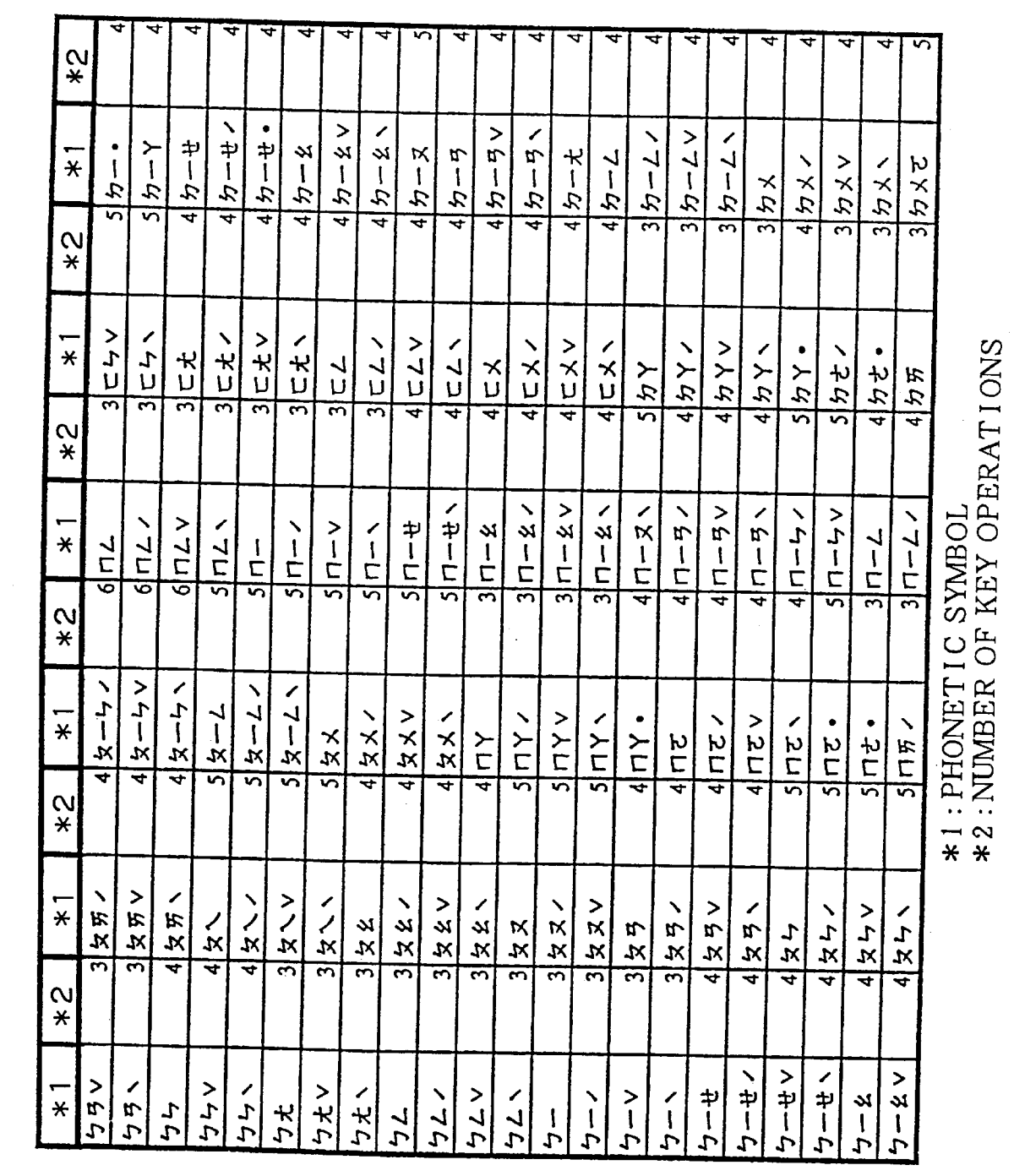
Figure 7J:
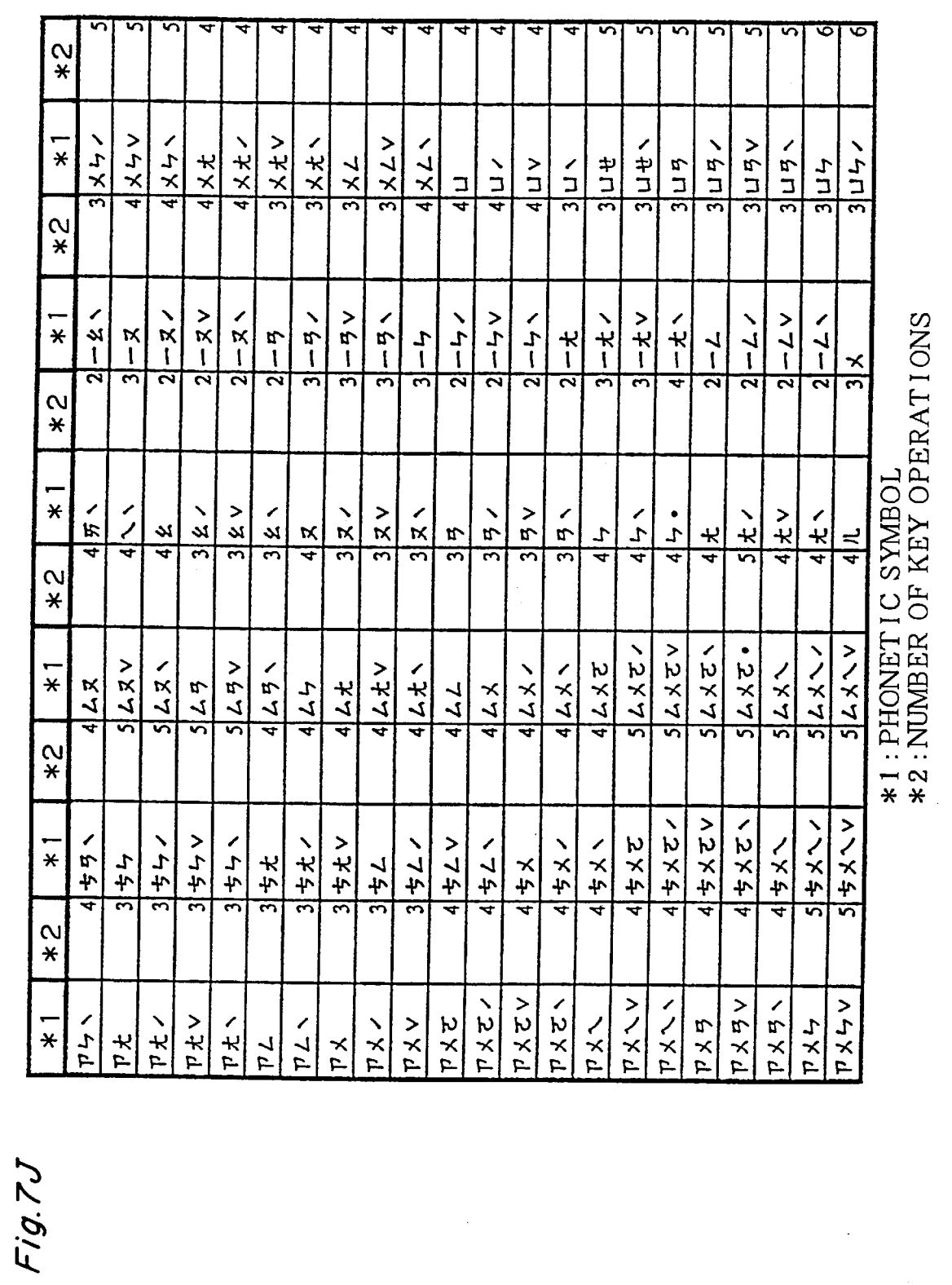

FIGS. 7A to 7K are diagrams each showing a reference table for the combination of the phonetic symbol of the Chinese character and the number of key operations according to the embodiment of the present invention.

FIG. 8 is a diagram showing the correspondence of a key to a phonetic symbol in a Chinese character input method using numeric keys, and an apparatus thereof according to the prior art.

FIG. 9 is a conceptual view showing a key arrangement in the Chinese character input method using a numeric key and an apparatus thereof according to the prior art.

DETAILED DESCRIPTION OF THE PREFERRED EMBODIMENTS

Figure 1:
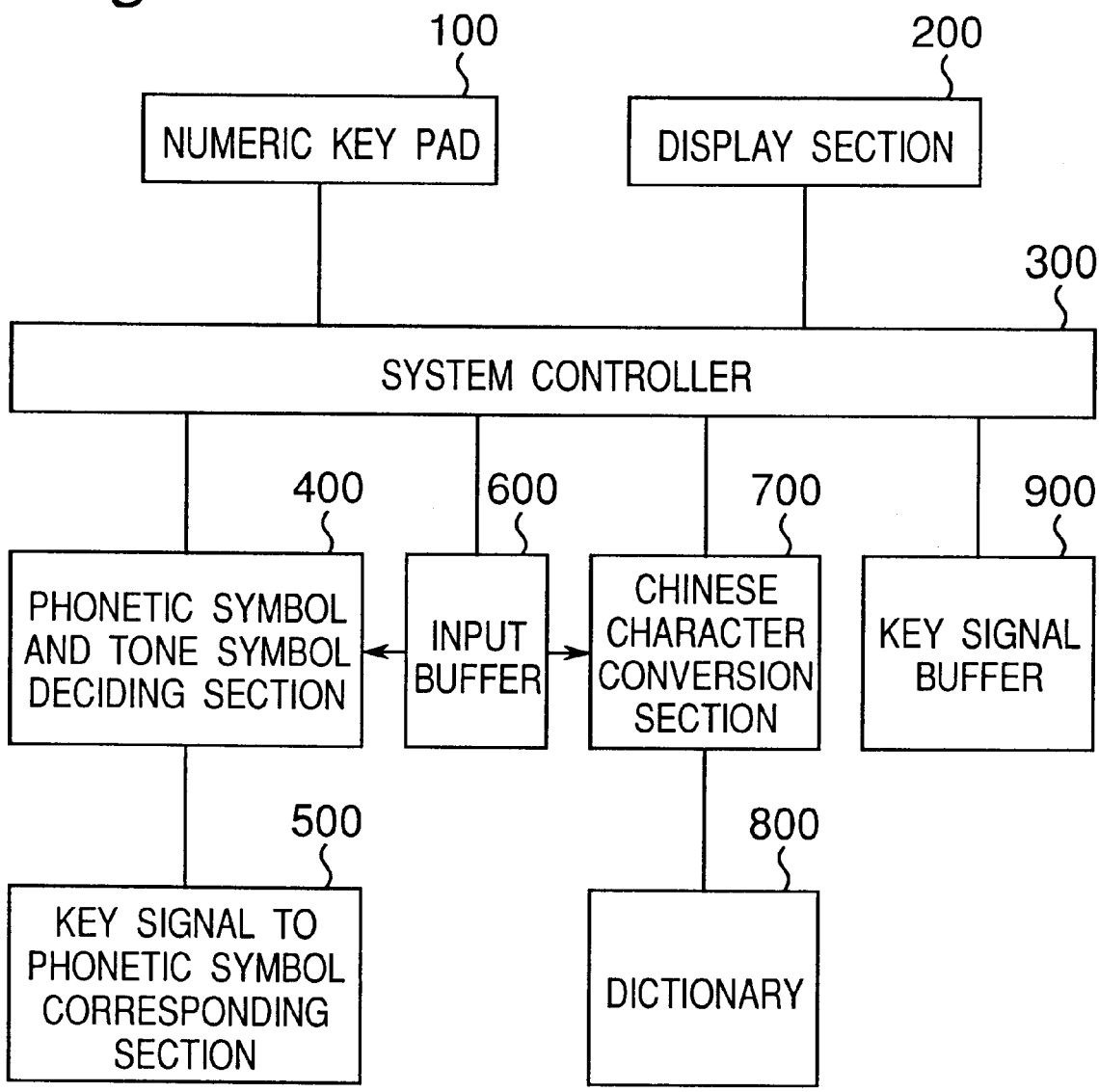
FIG. 1 is a system block diagram showing a Chinese character input method or device for using numeric keys according to an embodiment of the present invention.

A Chinese character input method and device according to an embodiment of the present invention will be described below in detail with reference to the accompanying drawings.

Most of modern electric products have timers. For example, the internal timer of a cellular phone is used for display of a current time and calculation of a talking time. Moreover, a character input device in the cellular phone also utilizes the timer as an auxiliary tool. A device for inputting a character by means of a numeric key mostly allocates several characters and symbols to one key. Therefore, when 0.5 second or more elapses without keys pressed down after a user presses down one key, the timer decides that the user has completely input one character or symbol to notify an end of input to a system. The system decides which character or symbol is desired by the user according to a key signal and number of key operations input by the user. For example, in the case where "a, b, c" is assigned to "2" in a telephone set, the system recognizes that the user wants to input a character of "a" when the user presses down the numeric key of "2" and then 0.5 second elapses without any pressed keys. When the user presses down the numeric key of "2" twice and then 0.5 second elapses without any pressed keys, the system recognizes that the user wants to input a character of "b". When the user presses down the numeric key of "2" four times and then 0.5 second elapses without any pressed keys, the system decides the repetition and recognizes that the user wants to input a character of "a". The present invention also employs this input rule.

FIG. 2 is a diagram showing one example of the correspondence of keys and phonetic symbols according to the present invention. As shown in FIG. 2, "[CHARACTER 9]", "[CHARACTER 10]" and "[CHARACTER 11]" as Medials are allocated on a key "*" and two Initials are then allocated on each of the keys 1 to 9 and 0 and one Initial of "[CHARACTER 5]" is allocated on a last key "#" in the original order of phonetic symbol table of the Chinese language. Similarly, two Finals are allocated on each of the keys 1 to 7 in the original order of the phonetic symbol table of Chinese language, while only one Final of "[CHARACTER 12]" is allocated on a key of "6". Subsequently, the First, Second and Third Tones of a tone symbol are allocated on the residual keys of "8", "9" and "0", and the fourth and light tones of the tone symbol are allocated on the key of "#". For example, when the user input "[CHARACTER 13]", it is necessary to press down a key of "5" twice. When the user inputs "[CHARACTER 14]" subsequently to the input of the Initial, it is necessary to press down a key of "4" once. Decision whether the user has pressed down the key of the Initial or the Final is based on a phonetic symbol and tone symbol decision rule. The key arrangement of the phonetic symbols is provided in accordance with the original order in the phonetic symbol table of the Chinese language. Therefore, it is possible to reduce a time taken for adapting the user to the key arrangement.

[CHARACTER 9]

–

[CHARACTER 10]

ㄨ

[CHARACTER 11]

ㄩ

[CHARACTER 12]

ㄊ

[CHARACTER 13]

ㄗ

[CHARACTER 14]

ㄠ

FIG. 1 is a system block diagram according to an embodiment of the present invention. In FIG. 1, a user presses down keys by a numeric key 100, and then information about the key signals of the pressed keys and number of key operations is transferred to a system controller 300. The system controller 300 transmits the information to a phonetic symbol and tone symbol deciding section 400. Referring to a key signal to phonetic symbol corresponding section 500, the phonetic symbol and tone symbol deciding section 400 fetches a corresponding phonetic symbol string. Then, referring to data stored in an input buffer 600 to decide whether the data are an Initial, a Final, a Medial sound or a Tone in response to the key signal, the section 400 fetches a relevant phonetic symbol or tone symbol by the key operation number or by deleting an impossible combination, thereby transferring the phonetic symbol or tone symbol to the system controller 300.

The system controller 300 outputs the fetched phonetic symbol or tone symbol to a display section 200 and shows the phonetic symbol or tone symbol to the user, and simultaneously stores the phonetic symbol or tone symbol in a key signal buffer 900 together with a key signal and a umber of key operations which have been input from the numeric key 100. The system controller 300 decides whether or not a user input waiting time from that time point exceeds 0.5 second. When the system decides that the user input waiting time exceeds 0.5 second, the data of the key signal buffer 900 are stored into the input buffer 600. Then, it is checked whether there is a tone symbol in the data or not. When there is a tone symbol, a Chinese character conversion section 700 refers to a dictionary 800, converts a phonetic symbol string stored in the input buffer 600 into a corresponding single Chinese character or word, and passes the system controller 300 the same single Chinese character or word. Then, the system controller 300 sends an output to the display section 200 to respond to the user.

Figure 3A:
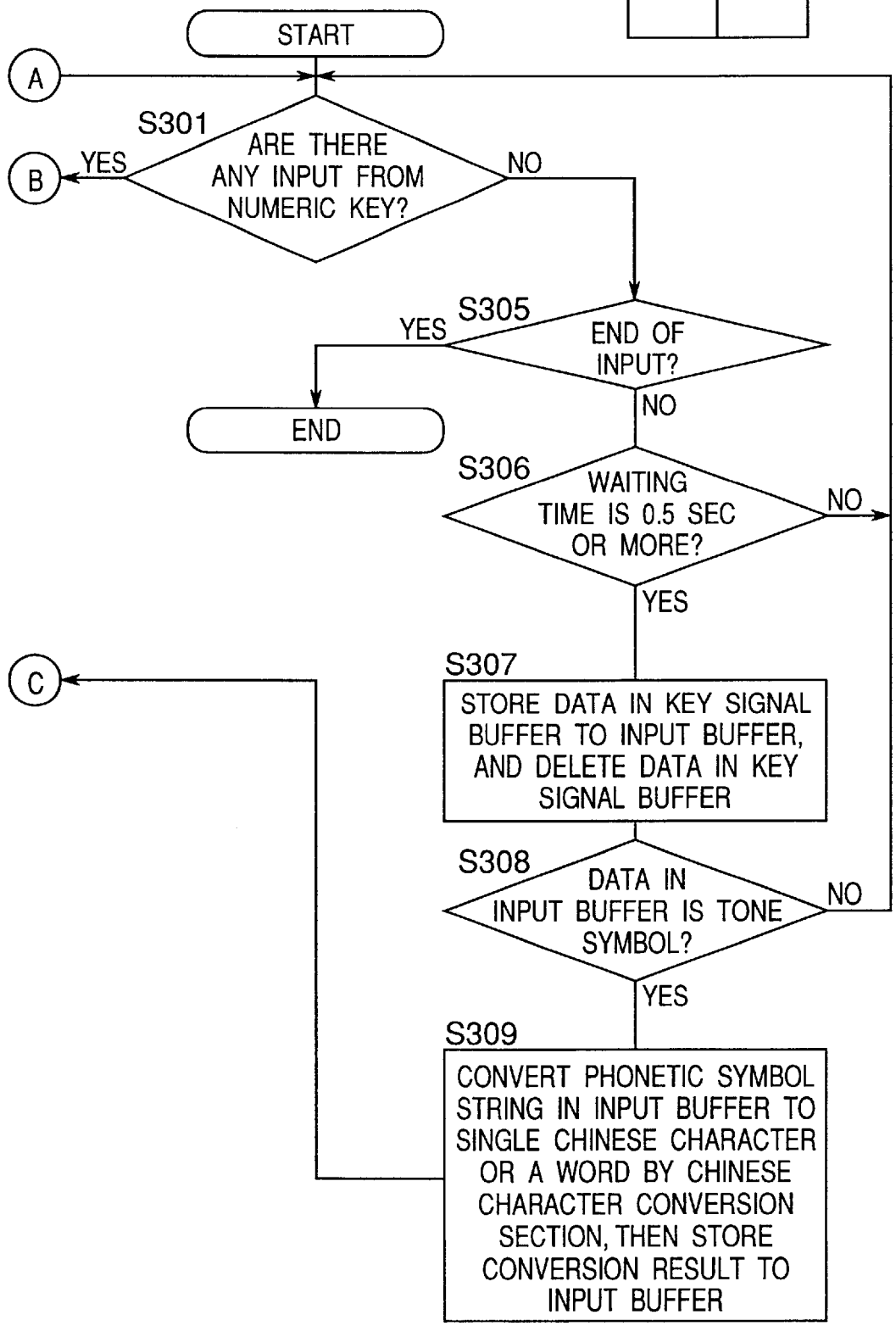
FIGS. 3A and 3B are a flowchart showing an operation to be executed mainly by a system controller according to the embodiment of the present invention.
Figure 3B:
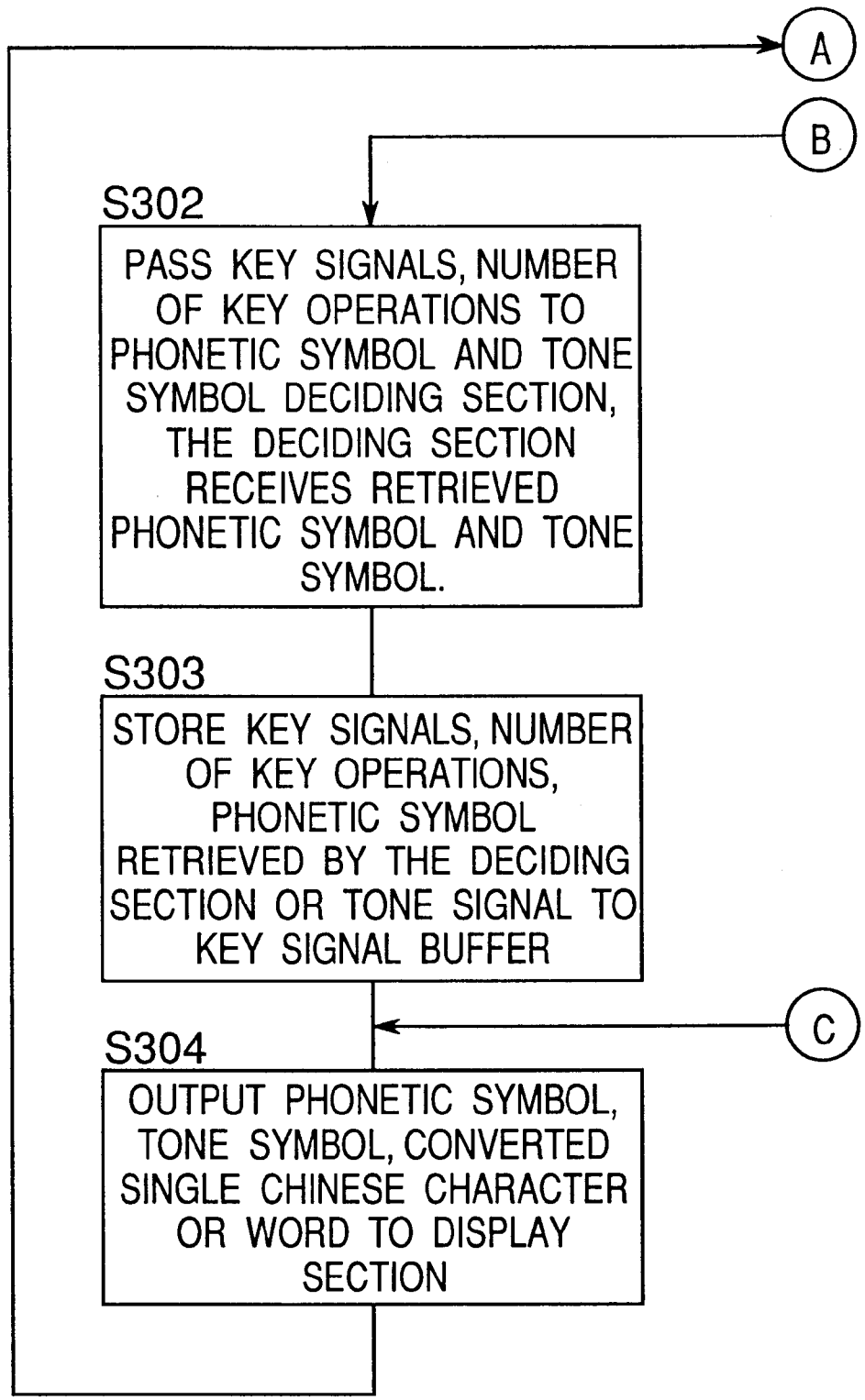

FIG. 3 is a flowchart showing an operation to be carried out mainly by the system controller 300 according to the embodiment of the present invention. First of all, it is decided whether an input is sent from the numeric key 100 at Step S301. When the input is sent, the routine proceeds to Step S302 where information about the key signal and the number of key operations which are input from the numeric key 100 are transferred to the phonetic symbol and tone symbol deciding section 400. Then, received is the return of the phonetic symbol and the tone symbol which are fetched by the phonetic symbol and tone symbol deciding section 400. Thereafter, the routine proceeds to Step S303 where the key signal, the number of key operations and the phonetic symbol or tone symbol fetched from the phonetic symbol and tone symbol deciding section 400 are stored to the key signal buffer 900.

Next, the routine proceeds to Step S304 where the phonetic symbol or tone symbol is output to the display section 200. Subsequently, the routine returns to the Step S301 where it is checked whether there is an input from the user or not. When the user presses down no key at the Step S301, the routines proceeds to Step S305 where it is verified whether a stop signal is received or not. When the reception of the stop signal is recognized, the current input operation is terminated. When it is checked that there is no stop signal, the routine proceeds to Step S306 where it is checked if an input waiting time exceeds 0.5 second or not. When the input waiting time does not exceed 0.5 second, the routine returns to the Step S301 where it is verified whether there is a user's input. When the input waiting time is equal to or more than 0.5 second, the routine proceeds to Step S307. The data of the key signal buffer 900 are stored to the input buffer 600. Thus, according to the decision whether the input waiting time exceeds 0.5 second or not, it can determine whether the user intends to input the phonetic symbol or tone symbol.

Then, the data of the key signal buffer 900 are deleted and the routine proceeds to Step S308 where it is decided whether the data stored in the input buffer 600 at the Step S307 are the tone symbol or not. When the data are not the tone symbol, the routine returns to the Step S301. When the data are the tone symbol, it is displayed that the data stored in the input buffer 600 can be converted into a corresponding single Chinese character or word. Then, the routine proceeds to Step S309 where a phonetic symbol string stored in the input buffer 600 is converted into a corresponding single Chinese character or word by the Chinese character conversion section 700, and the single Chinese character or word thus obtained by the conversion is stored to the input buffer 600. Then, the routine proceeds to the Step S304 where the single Chinese character or word thus obtained by the conversion is output to the display section 200. Subsequently, the routine returns to the Step S301 where it is checked the user's input.

Figure 4B:
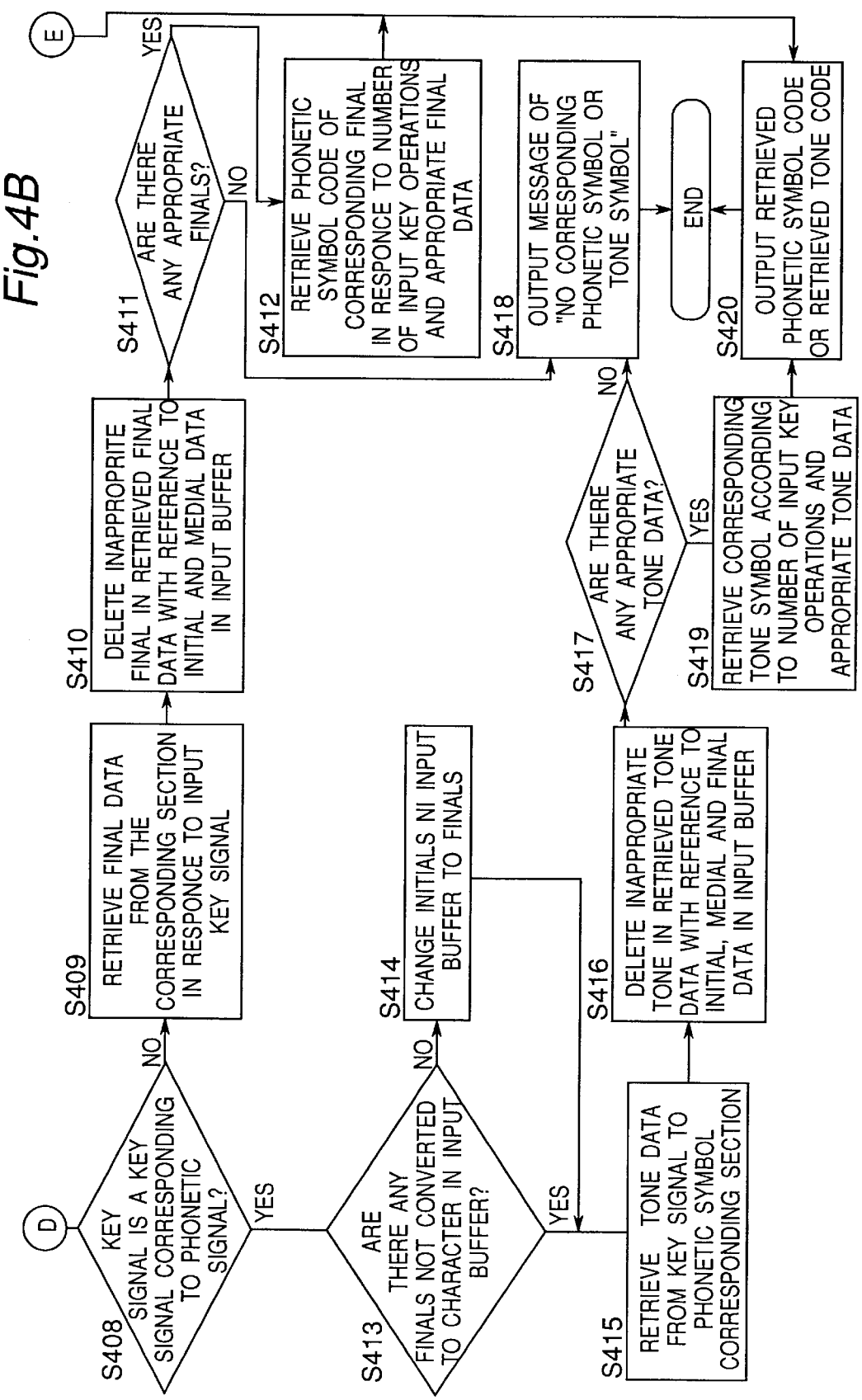

FIG. 4 is a flowchart showing an operation to be carried out mainly by the phonetic symbol and tone symbol deciding section 400 according to the embodiment of the present invention. First of all, it is checked that the input buffer 600 has a phonetic symbol which has not been converted into a character or not at Step S401. The purpose of this checking operation is to decide whether the user inputs an Initial or not.

When there is no phonetic symbol which has not been converted into a character, the routine proceeds to Step S402 where the key signal to phonetic symbol corresponding section 500 is searched in response to the input key signal to fetch corresponding Initial data. For example, when the user presses a key of "6" twice, the key signal of "6" is transferred to the key signal to phonetic symbol corresponding section 500 and "[CHARACTER 15]", "[CHARACTER 16]" of Initial data corresponding to the key signal of "6" are fetched. Then, the routine proceeds to Step S403. According to the number of the input key operations, the corresponding phonetic symbol of the Initial data is fetched from the fetched Initial data. In this example, the key is pressed down twice, and therefore the "[CHARACTER 16]" is obtained. Subsequently, the routine proceeds to Step S420.

When it is detected that there is a phonetic symbol which has not been converted at the step S401, since it is represented that the Initial data are input, the routine subsequently proceeds to the process of a Medial at the Step S404 where it is checked if the input key signal corresponds to the Medial or not.

When the key signal corresponds to the Medial, it indicates that the user currently intends to input the Medial, and therefore the routine proceeds to Step S405. The Medial data are fetched from the key signal to phonetic symbol corresponding section 500. According to the above-mentioned example, if the user presses down a key "*" twice, the Medial data "[CHARACTER 9]", "[CHARACTER 10]", "[CHARACTER 11]" corresponding to the key "*" are retrieved and the routine then proceeds to Step S406. In Step S406, with reference to the Initial data in the input buffer 600, inappropriate Medial are deleted from the retrieved Medial data. According to the above-mentioned example, since the Initial data in the input buffer 600 is the "[CHARACTER 16]", a combination with the "[CHARACTER 10]" is inappropriate. Therefore, the "[CHARACTER 10]" is deleted, and "[CHARACTER 9]" and "[CHARACTER 11]" remain.

Subsequently, the routine goes to Step S407 where the phonetic symbol of a corresponding Medial is retrieved based on the number of input key operations and appropriate Medial data. According to this example, the number of key operations is 2. Therefore, it can be determined that "[CHARACTER 11]" is to be input. Accordingly, the routine proceeds to Step S420 where the retrieved phonetic symbol of "[CHARACTER 11]" is output.

When it is decided that the key signal does not correspond to the Medial at the Step S404, the routine proceeds to Step S408 where it is decided whether the key signal corresponds to a tone symbol or not.

If the key signal does not correspond to the tone symbol, it is decided that the user intends to input the phonetic symbol of a Final, and the routine proceeds to Step S409. In response to the input key signal, Final data are retrieved from the key signal to phonetic symbol corresponding section 500. In the above-mentioned example, when the user presses down a key of "2" once, a key signal of "2" is transmitted to the key signal to phonetic symbol corresponding section 500, and "[CHARACTER 17]" and "[CHARACTER 18]" of the corresponding Final data are retrieved. Then, Referring to the routine proceeds to Step S410 where the Initial and Medial data in the input buffer 600, inappropriate Final are deleted from the retrieved Final data. According to the above-mentioned example, since the data in the input buffer 600 are the "[CHARACTER 16]" and "[CHARACTER 11]", a combination with the "[CHARACTER 17]" is inappropriate. Therefore, the "[CHARACTER 18]" is directly retrieved. Subsequently, the routine proceeds to Step S411 where it is verified whether there are any appropriate Finals or not. When there is no appropriate Final, the routine proceeds to Step S418 where a message saying that there is no corresponding phonetic symbol is given to the system controller 300. When there is an appropriate Final, the routine proceeds to Step S412 where the corresponding phonetic symbol of a Final is retrieved based on the number of input key operations and appropriate Final data. In the previous example, the key is pressed down only once and appropriate Final data have only the "[CHARACTER 18]", and therefore the routine proceeds to Step S420 where the corresponding phonetic symbol of a Final is output.

If the key signal input at the Step S408 is a tone symbol, the routine proceeds to Step S413 where it is checked whether or not the input buffer 600 has a Final which has not been converted into a character.

If there is a Final which has not been converted into a character, the routine proceeds to Step S415 where tone data are retrieved from the key signal to phonetic symbol corresponding section 500 in response to the input key signal. According to the above-mentioned example, when the user subsequently presses down a key of "9" once, the key signal to phonetic symbol corresponding section 500 retrieves "[CHARACTER 19]", and then the routine proceeds to Step S416 where with reference to Initial, Medial and Final data in the input buffer 600, an inappropriate tone is deleted from the retrieved tone data. According to the above-mentioned example, the "[CHARACTER 19]" is an appropriate tone symbol. Therefore, the "[CHARACTER 19]" is retrieved at the Step S416 and the routine then proceeds to Step S417.

At the Step S417, it is checked whether there is an appropriate tone symbol or not. When there is no appropriate tone symbol, the routine proceeds to Step S418 where a message saying that there is no corresponding tone symbol is given to the system controller 300. When it is detected that there is an appropriate tone symbol at the Step S417, the routine proceeds to Step S419. Based on the number of input key operations and appropriate tone data, a corresponding tone symbol is retrieved. Since he number of key operations is 1 and there is only one appropriate tone symbol of "[CHARACTER 19]", the routine proceeds to Step S420 where the retrieved tone symbol is output.

When it is detected that there is no Final which has not been converted into a character at the Step S413, it indicates that the user wants to input not Initial symbol but actually a Final symbol. Therefore, the routine proceeds to Step S414 where the Initial symbol stored in the input buffer 600 is modified into a Final symbol. Then, the routine proceeds to Step S415. For example, in the case where a key of "1" is pressed down once and a key of "8" is subsequently pressed down once, the input buffer 600 has no phonetic symbol which has not been converted into a character when the key of "1" is pressed down once. Therefore, the phonetic symbol and tone symbol deciding section 400 decides the "[CHACTER 4]". When the key of "8" is pressed down once, the First Tone of the tone symbol is decided. At that time, when it is found that the input buffer 600 has no Final data at the Step S413, "[CHARACTER 4]" is automatically modified into "[CHARACTER 20]" at the Step S414. Then, a processing is carried out for the tone symbol.

[CHARACTER 15]

ㄏ

[CHARACTER 16]

ㄐ

[CHARACTER 17]

ㄜ

[CHARACTER 18]

ㄝ

[CHARACTER 19]

ˊ

[CHARACTER 20]

ㄧ

Figure 5:
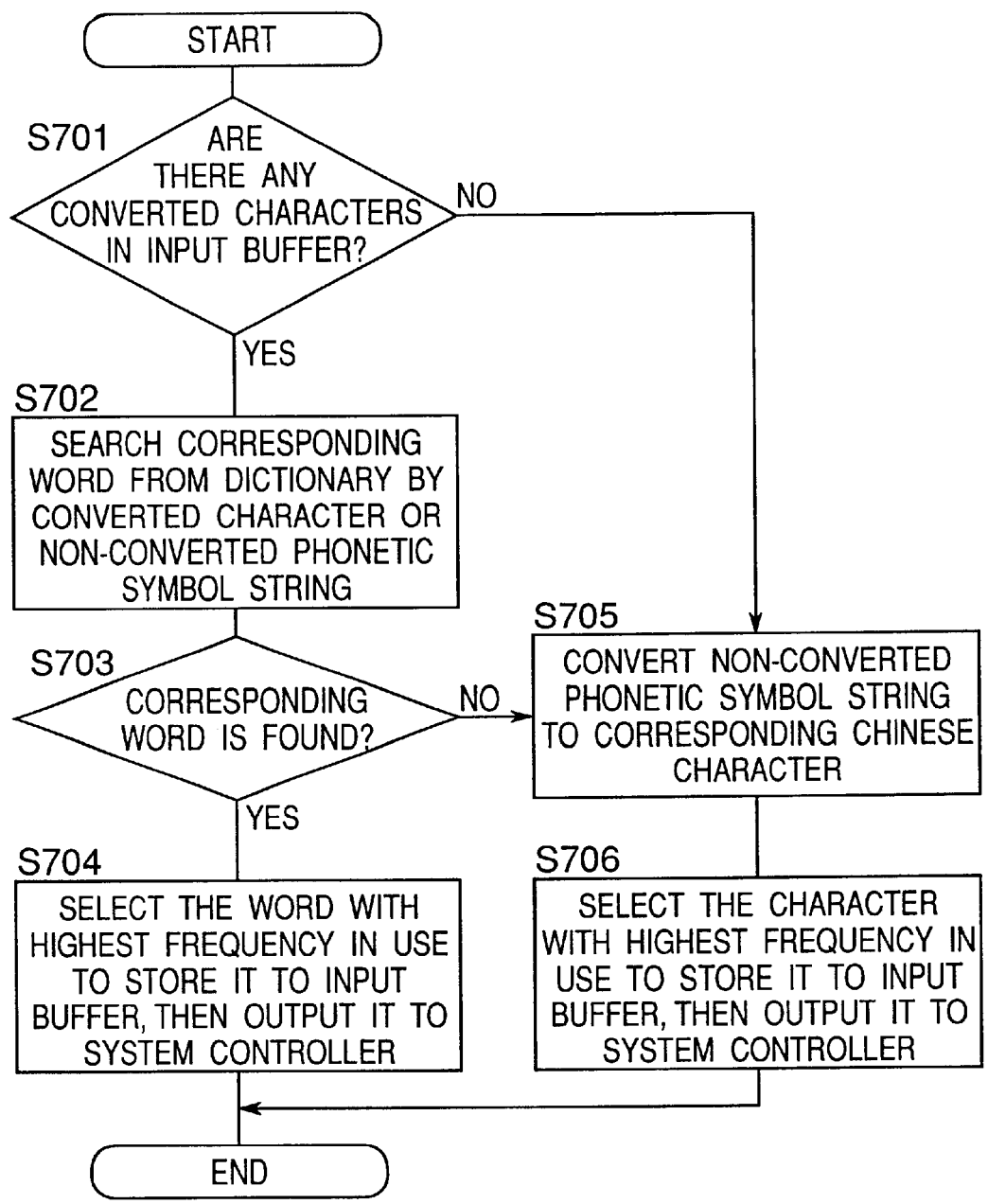
FIG. 5 is a flowchart showing an operation to be executed out mainly by a Chinese character conversion section according to the embodiment of the present invention.

FIG. 5 is a flowchart showing an operation to be carried out mainly by the Chinese character conversion section 700 according to the embodiment of the present invention. When the system controller 300 notifies the Chinese character conversion section 700 of a message that the conversion should be executed, the routine proceeds to Step S701 where it is checked whether the input buffer 600 has a converted character or not.

When there is a converted character, it indicates that a phonetic symbol string which is to be currently converted might be combined with the converted character to make one word. Then, the routine proceeds to Step S702 where a corresponding word is retrieved from the dictionary 800 based on the converted character and the phonetic symbol string which has not been converted.

Then, the routine proceeds into Step S703 where it is retrieved that there is a corresponding word or not. When there is the corresponding word, the routine proceeds to Step S704 where the detected corresponding word having the highest frequency in use is retrieved to be stored in the input buffer 600 and is then output to the system controller 300.

When it is decided that there is no corresponding word at the Step S703, the routine proceeds to Step S705 where a corresponding single Chinese character is retrieved from the dictionary 800 based on the phonetic symbol string which has not been converted yet. Then, the routine proceeds to Step S706 where the retrieved corresponding single Chinese character having the highest frequency in use is selected and stored in the input buffer 600.

When the input buffer 600 has no converted character at the Step S701, the routine directly proceeds to Step S705.

Next, the processing according to the present embodiment will be described more specifically with reference to the following actual example. FIG. 6 is a diagram showing one example of the correspondence of the input key to the result of conversion. An input key having an underline attached to the drawing represents that the user consecutively presses down this key twice. As shown, when 中華民国 is to be input, it is necessary to press down a key of "5" twice for [CHARACTER 21] of [CHARACTER 7] and press down a key of "1" twice for [CHARACTER 6] of [CHARACTER 8]. Thus, it is sufficient that one key is pressed down for one phonetic symbol or tone symbol.

According to the above-mentioned structure, the present invention copes with a method of inputting the phonetic symbol of the Chinese language by means of a keyboard in a computer. As shown in the Figure, in the display of the conversion result, 中華岷 ("[CHARACTER 22]") is immediately converted into 中華民国 when a key of "9" is pressed down. Because, a corresponding word is detected by the Chinese character conversion section 700 and thus 岷 is automatically changed into 民.

[CHARACTER 21]

ㄣ

[CHARACTER 22]

《 ㄨ ㄛ

FIGS. 7A to 7K show correspondence tables of 1,356 sets of legitimate combinations of phonetic symbols and number of key operations corresponding thereto according to the embodiment of the present invention.

The present invention is not restricted to the above-mentioned embodiment but can be appropriately modified and executed without changing the summary. For example, the arrangement of the key signal to phonetic symbol is not restricted to that of FIG. 2. The present invention can be carried out even if the key arrangements of a certain phonetic symbol are changed each other.

As described above, according to the method and the device of inputting a Chinese character using numeric keys of the present invention, the inconvenience and drawbacks caused by inputting the Chinese characters by means of a conventional numeric keypad can be eliminated. By fully utilizing twelve keys, an Initial, Final and a tone symbol can be arranged much better and the conventional complexity of the key arrangement of the phonetic symbol in the Chinese language can be reduced. The present invention is based on the order of the phonetic symbol table of the standard Chinese language and the correspondence relationship between the Initial and the Final is taken into consideration for the arrangement. Therefore, the difficulties of learning and the inconvenience of use can be eliminated. Moreover, the phonetic symbol and tone symbol deciding method can considerably reduce the number of key operations necessary for input. The input of the Chinese characters on the numeric keypads of a telephone set, the remote controls of a television set and audio products and the like becomes simpler and more convenient. As a matter of course, the application field of products can be broadened still more and the added value of the products can be increased.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. A method for inputting Chinese using numeric keys in which Chinese characters are input on a device having a numeric keypad with numeric keys, a storage and a display, wherein the device has a key signal to phonetic symbol corresponding section which stores phonetic symbols each corresponding to key signals based on a predetermined allocation, the predetermined allocation allocating all phonetic symbols of the Chinese language on the respective numeric keys so that a set of three Medials is allocated on one numeric key, and each set of two Initials with two Finals, a set of two Initials with one Final, and each set of two Initials with one Tone are selectively allocated on the other numeric keys, and the storage has a dictionary which stores phonetic symbols each with a single Chinese character or word, the single Chinese character or the word corresponding to the phonetic symbol, the method comprising:

inputting a key signal from the key pad based on an operation performed by a user in accordance with the correspondence of the key signal to the phonetic symbol;

retrieving one of a phonetic symbol and a tone symbol from the key signal to phonetic symbol corresponding section in response to the key signal input by the user;

collating the retrieved one of the phonetic symbol and the retrieved tone symbol with phonetic symbols already input to obtain a corresponding one of a phonetic symbol and a corresponding tone symbol in accordance with a combination rule of the number of key operations and the phonetic symbol of the Chinese language;

deciding whether the obtained symbol is a phonetic symbol or a tone symbol, and returning to the inputting a key signal to wait for user's input when the obtained symbol is decided to be a phonetic symbol, or searching the dictionary based on a phonetic symbol string already input to retrieve a corresponding single Chinese character or a corresponding word and then outputting the retrieved character or word to the display when the obtained symbol is decided to be a tone symbol; and returning to the inputting a key signal to wait for a next input when the user gives no command for stopping the input.

2. The method according the claim 1, wherein the method of allocating the numeric key and the phonetic symbol corresponding to the numeric key in the key signal to phonetic symbol corresponding section has a configuration in which:

a numeric key of "1" corresponds to ㄅㄆ ㄚㄛ;

a numeric key of "2" corresponds to ㄇㄈ ㄜㄝ;

a numeric key of "3" corresponds to ㄉㄊ ㄞㄟ;

a numeric key of "4" corresponds to ㄋㄌ ㄠㄡ;

a numeric key of "5" corresponds to 《ㄎ ㄢㄣ;

a numeric key of "6" corresponds to ㄏㄐ ㄤ;

a numeric key of "7" corresponds to ㄑㄒㄥㄦ;

a numeric key of "8" corresponds to ㄓㄔ and the first Tone;

a numeric key of "9" corresponds to ㄕㄖ and the second Tone;

a numeric key of "0" corresponds to ㄗㄘ and the third Tone;

a numeric key of "*" corresponds to ㄧㄨㄩ; and a numeric key of "#" corresponds to ㄙ, the fourth Tone and the light Tone.

3. An apparatus for inputting Chinese using numeric keys, which has a numeric keypad, a storage and a display, the apparatus comprising;

a key signal to phonetic symbol corresponding section operable to store phonetic symbols each corresponding to key signals based on a predetermined allocation, the predetermined allocation allocating all phonetic symbols of the Chinese language on the respective numeric keys so that a set of three Medials is allocated on one numeric key, and each set of two Initials with two Finals, a set of two Initials with one Final, and each set of two Initials with one Tone are selectively allocated on the other numeric keys;

a dictionary operable to store phonetic symbols each with a single Chinese character or word, the single Chinese character or the word corresponding to the phonetic symbol;

a phonetic symbol and tone symbol deciding section operable to collate a key signal input by a user with phonetic symbols already input, based on the key signal and the number of key operations, and deciding whether the input key corresponds to a phonetic symbol or a tone symbol to decide whether the key signal is continuously received or is converted into the Chinese language;

a Chinese character conversion section operable to search the dictionary by using the obtained legitimate phonetic symbol string as a search key to carry out conversion into a corresponding single Chinese character or a corresponding word; and a system controller operable to control the key signal so as to control a procedure for converting the phonetic symbol into the Chinese character and to control an output of data.

\* \* \* \* \*